US008501843B2

(12) United States Patent
Ishida et al.

(10) Patent No.: US 8,501,843 B2
(45) Date of Patent: Aug. 6, 2013

(54) OPTICAL FILTER

(75) Inventors: Tatsuya Ishida, Tokyo (JP); Toshiyuki Takahashi, Tokyo (JP)

(73) Assignee: Adeka Corporation, Tokyo (JP)

( * ) Notice: Subject to any disclaimer, the term of this patent is extended or adjusted under 35 U.S.C. 154(b) by 364 days.

(21) Appl. No.: 11/794,260

(22) PCT Filed: Jun. 9, 2006

(86) PCT No.: PCT/JP2006/011579
§ 371 (c)(1),
(2), (4) Date: Jun. 27, 2007

(87) PCT Pub. No.: WO2006/137272
PCT Pub. Date: Dec. 28, 2006

(65) Prior Publication Data
US 2008/0125524 A1 May 29, 2008

(30) Foreign Application Priority Data

Jun. 24, 2005 (JP) ................................. 2005-185023
Feb. 2, 2006 (JP) ................................. 2006-025518
May 25, 2006 (JP) ................................. 2006-145534

(51) Int. Cl.
| C08G 73/10 | (2006.01) |
| C08K 5/34 | (2006.01) |
| C08K 5/3445 | (2006.01) |
| F21V 9/00 | (2006.01) |
| G02B 5/02 | (2006.01) |
| G02C 7/10 | (2006.01) |
| G02F 1/361 | (2006.01) |
| G03B 11/00 | (2006.01) |

(52) U.S. Cl.
USPC ............................. 524/104; 524/105; 252/582

(58) Field of Classification Search
USPC .................................. 524/104, 105; 252/582
See application file for complete search history.

(56) References Cited

U.S. PATENT DOCUMENTS

| 6,775,059 | B2 | 8/2004 | Kuwabara |
| 2004/0184173 | A1* | 9/2004 | Kobayashi et al. ............ 359/885 |
| 2005/0008969 | A1 | 1/2005 | Miyako et al. |
| 2005/0035336 | A1 | 2/2005 | Kuwabara |
| 2005/0042531 | A1* | 2/2005 | Lee et al. ............................ 430/7 |
| 2005/0186421 | A1* | 8/2005 | Choi et al. .............. 428/355 AC |
| 2005/0280342 | A1* | 12/2005 | Wenz ............................ 313/112 |
| 2006/0068128 | A1* | 3/2006 | Greener et al. ................. 428/1.1 |
| 2006/0073407 | A1 | 4/2006 | Yamanobe et al. |

FOREIGN PATENT DOCUMENTS

| JP | 62184079 | 8/1987 |
| JP | 8245927 | 9/1996 |
| JP | 9279109 | 10/1997 |
| JP | 10-77427 | 3/1998 |
| JP | 10-133013 | 5/1998 |
| JP | 2004-275432 | 10/2000 |
| JP | 2000-338325 | 12/2000 |
| JP | 2002-200711 | 7/2002 |
| JP | 2002-313140 | 10/2002 |
| JP | 2003-21715 | 1/2003 |
| JP | 2003-82302 | 3/2003 |
| JP | 2003-337410 | 11/2003 |
| JP | 2004-107566 | 4/2004 |
| JP | 2004-219668 | 8/2004 |
| JP | 2005-49847 | 2/2005 |
| JP | 2005-54031 | 3/2005 |
| JP | 2005331545 | 12/2005 |
| JP | 2006163172 | 6/2006 |
| WO | 2004/048480 A1 | 6/2004 |

OTHER PUBLICATIONS

English language machine translation of JP 10-133013.*
English machine translation of Jp 8-245927.*
English machine translation of JP 8-245927, published Sep. 24, 1996.*
JP Notice of Rejection dated Feb. 21, 2012, with English Translation.
Korean Official Action—10-2007-7018563—Aug. 1, 2012.

* cited by examiner

Primary Examiner — Angela C Scott
(74) Attorney, Agent, or Firm — Young & Thompson

(57) ABSTRACT

An optical filter comprising at least one dye compound (i), at least one layered clay mineral (ii), and thermoplastic substance (iii) if needed. The optical filter of the present invention is excellent in light resistance and moist heat resistance and suitable for improving the image quality and preventing glare due to external light in image display devices.

12 Claims, No Drawings

OPTICAL FILTER

TECHNICAL FIELD

The present invention relates to an optical filter comprising a dye compound, layered clay mineral, and optionally a thermoplastic substance. The optical filter is particularly useful as an optical filter for image display devices.

BACKGROUND ART

Compounds having strong light absorption at specific wavelength are used in recording layers of optical recording media such as CD-R, DVD-R, DVD+R, and blue laser recording discs and in optical elements of image display devices such as liquid crystal displays (LCD), plasma display panels (PDP), electroluminescence displays (ELD), cathode-ray tube displays (CRT), fluorescent display tubes, and field emission displays.

Optical elements in image display devices are used, for example, as light absorbers in color filters. Image display devices generate color images by combining light in three primary colors, red, blue, and green, but the beam used for generating color images includes light lowering display quality such as 550- to 600-nm light, which is between green and red, and also includes 750- to 1100-nm light, which possibly causes malfunction of infrared remote controllers. Optical filters are required to have a function of selectively absorbing light in such unwanted wavelengths and also absorbing light at 480 to 500 nm and 540 to 560 nm in order to prevent reflection and glare of external light from fluorescent lamps or others. In image display devices and the like, therefore, optical filters comprising light-absorbing compounds (light absorbers) selectively absorbing light at such wavelengths are used.

Conventionally, an optical filter has been manufactured by laminating an optical film comprising a light-absorbing compound (light absorber) selectively absorbing light at specific wavelengths with a transparent substrate such as glass via an adhesive layer. Thus, there have been problems of high cost due to many steps involved in production and difficulty in preparing thin layer-shaped optical filters.

Patent Document 1 discloses a film for electronic displays containing a dye and carbon black in the adhesive layer, Patent Document 2 discloses an adhesive containing a dye, and Patent Document 3 discloses a filter for displays using an adhesive comprising a dye.

It was however difficult to prevent the dye compounds in the adhesive layers from photo-, thermal-, or other degradation, and there has been no available optical filter to ensure sufficient optical properties yet.

On the other hand, Patent Document 4 discloses a color filter containing a color material in which a dye is intercalated in a clay, Patent Document 5 discloses an aqueous ink composition containing a colored composite wherein interlayer ions in smectite, which is a clay-type intercalation compound, are exchanged with dyes, and Patent Document 6 discloses an optical filter having a filter layer containing fine particles in which a dye is absorbed on surfaces thereof. However, nothing has been suggested on use of such color materials or colored composites in adhesive layers of optical filters or on improvement of moist heat resistance of optical filters by using such color materials or colored composites.

Patent Document 7 discloses a near infrared-absorbing film having a near infrared-absorbing layer containing a cyanine compound having a specific structure and a diimmonium compound as essential components. In the near infrared-absorbing film, however, use of another dye compound such as a cyanine compound together with the diimmonium compound caused deterioration of the moist heat resistance and/or light resistance due to the interaction with such another dye compound, while dispensing with such another dye compound increased absorption in the visible region. Thus, performances of this film were not sufficient.

Patent Document 1: Japanese Patent Laid-Open Publication No. 2003-82302
Patent Document 2: Japanese Patent Laid-Open Publication No. 2004-107566
Patent Document 3: Japanese Patent No. 3311720
Patent Document 4: Japanese Patent Laid-Open Publication No. H10-77427
Patent Document 5: Japanese Patent Laid-Open Publication No. H10-133013
Patent Document 6: Japanese Patent Laid-Open Publication No. 2000-338325
Patent Document 7: Japanese Patent Laid-Open Publication No. 2003-21715

DISCLOSURE OF THE INVENTION

Problems to be Solved by the Invention

An object of the present invention is therefore to provide an optical filter with excellent light resistance and moist heat resistance even in its adhesive layer.

Means for Solving the Problems

The present inventors have extensively studied and found that the above problems can be solved by using a dye compound and a layered clay mineral together in the adhesive layer.

The present invention has been accomplished on the basis of the above findings and provides an optical filter characterized by comprising at least one dye compound (i), at least one layered clay mineral (ii), and optionally a thermoplastic substance (iii).

BEST MODES FOR CARRYING OUT THE INVENTION

The optical filter of the present invention will be detailed with preferred embodiments below.

As the dye compound (i) related to the present invention, any of known cyanine compounds used in conventional optical filters may be used singly or in combination without particular limitation.

The dye compound (i) specifically includes cyanine compounds, diimmonium compounds, azo compounds and metal complexes thereof, azomethine dyes, triarylmethane dyes, azines, thiazine dyes, oxazines, xanthene dyes, phthalocyanines, porphyrins, pyrromethene dyes, anthraquinones, alizarin dyes, acridines, quinolines, indamine dyes, rhodamine dyes, squarilium compounds, and styryl dyes. Among them, cyanine compounds and diimmonium compounds are preferred because they are intercalated between layers of layered clay minerals and hence less affected by external factors such as ultraviolet rays and moisture, resulting in high light resistance and moist heat resistance, and because they have high affinity to organic solvents with low polarity.

The above cyanine compounds specifically include the compounds represented by general formula (I) below.

[Formula 1]

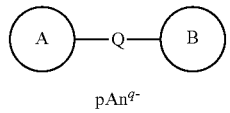

pAn^{q-}

(I)

(In the formula, ring A is a group represented by (a) or (b) below; ring B is a group represented by (a) or (c) below; Q represents a linkage constituting a polymethine chain in which a cyclic structure may be contained; (a) hydrogen atom(s) in the polymethine chain may be replaced by a halogen atom, cyano group, alkyl group, alkoxy group, aryl group, or substituted aryl group; $An^{q-}$ represents a q-valent anion, q represents 1 or 2; and p represents a coefficient to keep the electric charge neutral.)

[Formula 2]

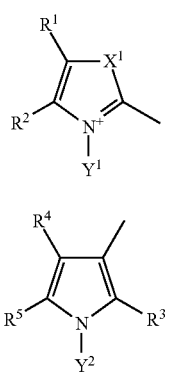

(a)

(b)

(c)

(In the formula, each of $R^1$, $R^2$, $R^3$, $R^4$, $R^5$, $R^6$, and $R^7$ independently represents a hydrogen atom, hydroxyl group, optionally substituted $C_{1-8}$ alkyl group, optionally substituted $C_{1-8}$ alkoxy group, optionally substituted $C_{6-30}$ aryl group, halogen atom, nitro group, cyano group, or substituent represented by general formula (II) below; in combinations of $R^1$ and $R^2$, $R^4$ and $R^5$, and $R^6$ and $R^7$, the two substituents in each combination may be linked to form a $C_{3-12}$ carbocyclic or heterocyclic ring system; each of $X^1$ and $X^2$ independently represents an oxygen atom, sulfur atom, selenium atom, —$CR^8R^9$—, —NH—, or —$NY^a$—; each of $R^8$ and $R^9$ independently represents an optionally substituted $C_{1-8}$ alkyl group, optionally substituted $C_{6-30}$ aryl group, substituent represented by general formula (II) below, or substituent represented by general formula (III) below; and each of $Y^a$, $Y^1$, and $Y^2$ independently represents a hydrogen atom, optionally substituted $C_{1-8}$ alkyl group, optionally substituted $C_{1-8}$ alkoxy group, optionally substituted $C_{6-30}$ aryl group, or substituent represented by general formula (II) below.)

[Formula 3]

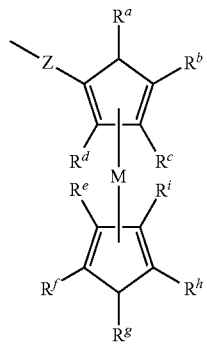

(II)

(In the formula, each of $R^a$ to $R^i$ independently represents a hydrogen atom, hydroxyl group, or $C_{1-4}$ alkyl group; (a) methylene group(s) in the alkyl group may be replaced by —O— or —CO—; Z represents a direct bond or optionally substituted $C_{1-8}$ alkylene group; (a) methylene group(s) in the alkylene group may be replaced by —O—, —S—, —CO—, —COO—, —OCO—, —$SO_2$—, —NH—, —CONH—, —NHCO—, —N=CH—, or —CH=CH—; and M represents a metal atom.)

[Formula 4]

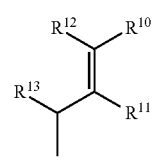

(III)

(In the formula, each of $R^{10}$ to $R^{13}$ independently represents a hydrogen atom, halogen atom, optionally substituted $C_{1-4}$ alkyl group, or optionally substituted $C_{1-4}$ alkoxy group; and $R^{10}$ and $R^{11}$ may be linked to form a $C_{3-12}$ carbocyclic or heterocyclic ring system.)

In general formula (I), as the linkage represented by Q, which constitutes the polymethine chain in which a cyclic structure may be contained, preferred groups are represented by (1) to (6) below.

[Formula 5]

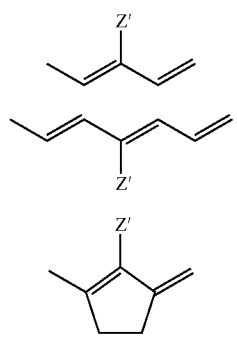

(1)

(2)

(3)

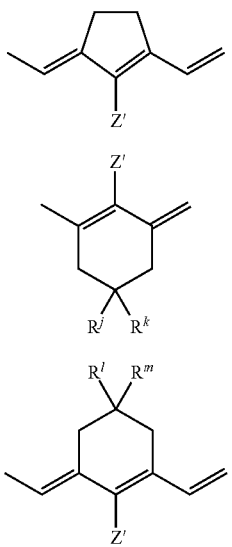

(In the formula, each of $R^j$, $R^k$, $R^l$, and $R^m$ independently represents a hydrogen atom, hydroxyl group, halogen atom, cyano group, $C_{6-30}$ aryl group, diphenylamino group, $C_{1-8}$ alkyl group, or $C_{1-8}$ alkoxy group; and Z' is identical with that in general formula (II).)

In general formula (I), the anion represented by $An^{q-}$ includes, as a monovalent ion, for example, halides such as chloride, bromide, iodide, or fluoride; inorganic anions such as perchlorate, chlorate, thiocyanate, hexafluorophosphate, hexafluoroantimonate, and tetrafluoroborate; organic sulfonates such as benzenesulfonate, toluenesulfonate, trifluoromethanesulfonate, diphenylamine-4-sulfonate, 2-amino-4-methyl-5-chlorobenezenesulfonate, and 2-amino-5-nitrobenzenesulfonate; organic phosphates or related anions such as octylphosphate, dodecylphosphate, octadecylphosphate, phenylphosphate, nonylphenylphosphate, and 2,2'-methylenebis(4,6-di-tert-butylphenyl)phosphonate; bistrifluoromethylsulfonylimide anion, bisperfluorobutylsulfonylimide anion, perfluoro-4-ethylcyclohexanesulfonate, tetrakis(pentafluorophenyl)borate, and others. Examples of divalent anions include benzenedisulfonate, naphthalenedisulfonate, and others. There may be also used, if needed, anionic quenchers, which can deactivate (quench) active molecules in the excited states; metallocene anions such as ferrocenes and ruthenocenes in which an anionic group, such as carboxylate, phosphonate, and sulfonate, is present on the cyclopentadienyl ring(s); or others.

The above quencher anions include, for example, the anions represented by general formula (A) or (B) below, the anions described in Japanese Patent Laid-Open Publication No. S60-234892, Japanese Patent Laid-Open Publication No. H5-43814, Japanese Patent Laid-Open Publication No. H5-305770, Japanese Patent Laid-Open Publication No. H6-239028, Japanese Patent Laid-Open Publication No. H9-309886, Japanese Patent Laid-Open Publication No. H9-323478, Japanese Patent Laid-Open Publication No. H110-45767, Japanese Patent Laid-Open Publication No. H11-208118, Japanese Patent Laid-Open Publication No. 2000-168237, Japanese Patent Laid-Open Publication No. 2002-201373, Japanese Patent Laid-Open Publication No. 2002-206061, Japanese Patent Laid-Open Publication No. 2005-297407, Japanese Patent Application Laid-Open No. H7-96334, and International Publication No. WO98/29257, and the like.

[Formula 6]

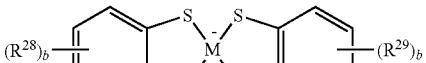

(A)

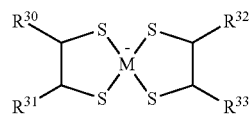

(B)

(In the formulae, M' represents a nickel, cobalt, or copper atom; each of $R^{28}$ and $R^{29}$ represents a halogen atom, $C_{1-8}$ alkyl group, $C_{6-30}$ aryl group, or —$SO_2$-G; G represents an alkyl, optionally halogenated aryl, dialkylamino, diarylamino, piperidino, or morpholino group; and each of a and b represents 0 to 4. Each of $R^{30}$, $R^{31}$, $R^{32}$, and $R^{33}$ independently represents an alkyl, alkylphenyl, alkoxyphenyl, or halogenated phenyl group.)

In general formula (I), the optionally substituted $C_{1-8}$ alkyl group represented by $R^1$, $R^2$, $R^3$, $R^4$, $R^5$, $R^6$, $R^7$, $R^8$, $R^9$, $Y^a$, $Y^1$, or $Y^2$ includes methyl, ethyl, propyl, isopropyl, butyl, sec-butyl, tert-butyl, isobutyl, amyl, isoamyl, tert-amyl, hexyl, cyclohexyl, cyclohexylmethyl, cyclohexylethyl, heptyl, isoheptyl, tert-heptyl, n-octyl, isooctyl, tert-octyl, 2-ethylhexyl, trifluoromethyl, trichloromethyl, tribromomethyl, 1,2-dichloroethyl, 3,3,3-trifluoropropyl, and others. The optionally substituted $C_{1-8}$ alkoxy group represented by $R^1$, $R^2$, $R^3$, $R^4$, $R^5$, $R^6$, $R^7$, $Y^a$, $Y^1$, or $Y^2$ includes methyloxy, ethyloxy, isopropyloxy, propyloxy, butyloxy, pentyloxy, isopentyloxy, hexyloxy, heptyloxy, octyloxy, 2-ethylhexyloxy, trifluoromethoxy, trichloromethoxy, tribromomethoxy, and others. The optionally substituted $C_{6-30}$ alkyl group represented by $R^1$, $R^2$, $R^3$, $R^4$, $R^5$, $R^6$, $R^7$, $R^8$, $R^9$, $Y^a$, $Y^1$, or $Y^2$ includes phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,5-di-tert-octylphenyl, 2,4-dicumylphenyl, cyclohexylphenyl, biphenyl, 2,4,5-trimethylphenyl, benzyl, phenethyl, 2-phenylpropan-2-yl, diphenylmethyl, triphenylmethyl, styryl, cinnamyl, 2-phenylpropan-2-yl, diphenylmethyl, and others. The halogen atom represented by $R^1$, $R^2$, $R^3$, $R^4$, $R^5$, $R^6$, or $R^7$ includes fluorine, chlorine, bromine, and iodine atoms. When two substituents $R^1$ and $R^2$, $R^4$ and $R^5$, or $R^6$ and $R^7$ are linked to each other, the $C_{3-12}$ carbocyclic or heterocyclic ring system to be formed includes aromatic rings such as benzene, naphthalene, chlorobenzene, bromobenzene, methylbenzene, ethylbenzene, methoxybenzene, and ethoxybenzene rings; heterocycles such as furan, benzofuran, pyrrole, thiophene, pyridine, quinoline, and thiazole rings, and alicylcic rings such as cyclopropane, cyclobutane, cyclopentane, cyclohexane, cycloheptane, and cyclooctane rings.

In general formula (II), the $C_{1-4}$ alkyl group represented by $R^a$ to $R^i$ includes methyl, ethyl, propyl, isopropyl, butyl, sec-butyl, tert-butyl, isobutyl, and others; the group in which (a) methylene group(s) in the alkyl group is/are replaced by —O— includes methoxy, ethoxy, propyloxy, isopropyloxy, methoxymethyl, ethoxymethyl, 2-methoxyethyl, and others; and the group in which (a) methylene group(s) in the alkyl group is/are replaced by —CO— includes acetyl, 1-formylethyl, acetylmethyl, 1-formylpropyl, 2-oxobutyl, 2-acetylethyl, 1-formylisopropyl, and others. The optionally substituted $C_{1-8}$ alkylene group represented by Z includes methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, ethane-1,1-diyl, propane-2,2-diyl, and others; and the group in which (a) methylene group(s) in the alkylene group is/are replaced by —O—, —S—, —CO—, —COO—, —OCO—, —SO$_2$—, —NH—, —CONH—, —NHCO—, —N=CH—, or —CH=CH— includes methyleneoxy, ethyleneoxy, oxymethylene, thiomethylene, carbonylmethylene, carbonyloxymethylene, methylenecarbonyloxy, sulfonylmethylene, aminomethylene, acetamide-N,2-diyl, propionamide-N,3-diyl, N-ethylmethanimine-1,2'-diyl, ethenylene, propenylene, and others. The metal atom represented by M includes Fe, Co, Ni, Ti, Cu, Zn, Zr, Cr, Mo, Os, Mn, Ru, Sn, Pd, Rh, Pt, Ir, and others.

In general formula (III), as the optionally substituted $C_{1-4}$ alkyl group represented by $R^{10}$ to $R^{13}$, optionally substituted $C_{1-4}$ alkoxy group represented by $R^{10}$ to $R^{13}$, and $C_{3-12}$ carbocyclic or heterocyclic ring system formed by $R^{10}$ and $R^{11}$ linked to each other, there may be mentioned those illustrated for the corresponding groups and rings in general formula (I).

Among the cyanine compounds represented by general formula (I), the compounds represented by general formula (VII) below are further preferred for optical filters because of low manufacturing cost, high light resistance, and high moist heat resistance.

[Formula 7]

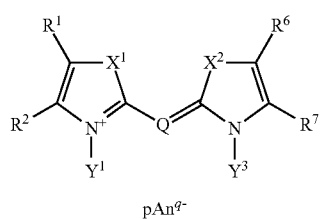

(In the formula, $R^1$, $R^2$, $R^6$, $R^7$, $X^1$, $X^2$, $Y^1$, $Y^3$, $An^{q-}$, p, and q are identical with those in general formula (I) and Q is identical with that in general formula (I).)

Illustrative examples of the cyanine compounds represented by above general formula (I) related to the present invention include the following Compounds No. 1 to No. 48. The following illustrations show only the cyanine cations without any anions.

[Formula 8]

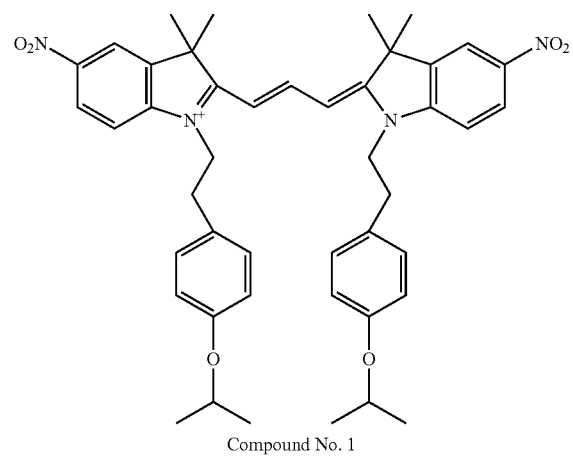

Compound No. 1

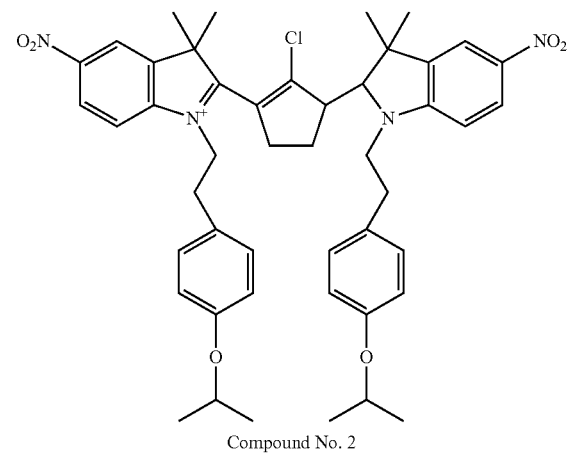

Compound No. 2

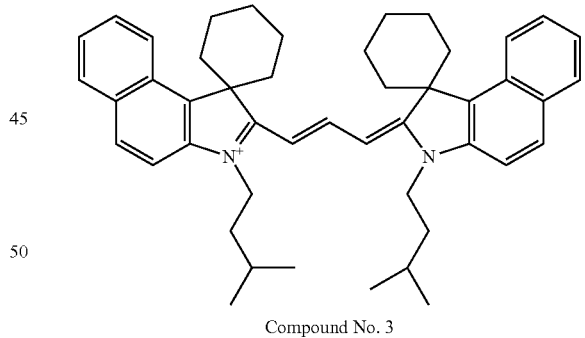

Compound No. 3

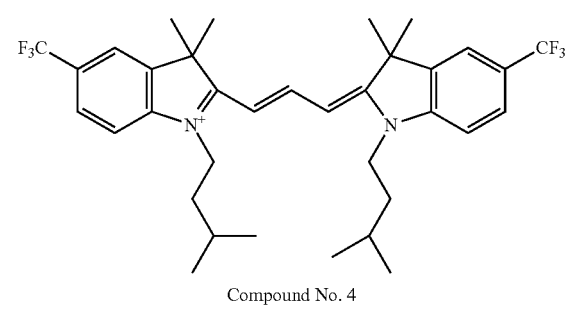

Compound No. 4

-continued
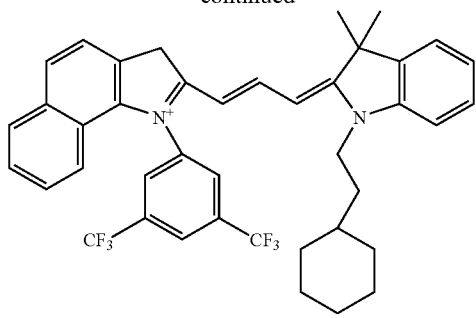
Compound No. 5
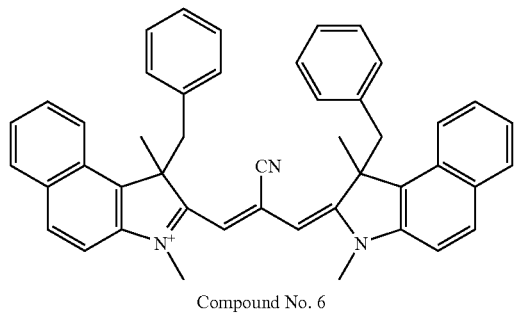
Compound No. 6
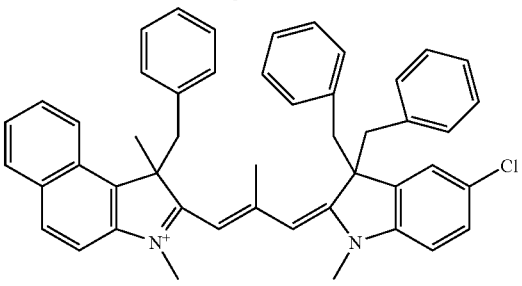
Compound No. 7
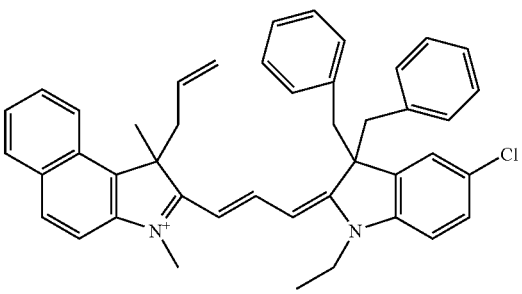
Compound No. 8
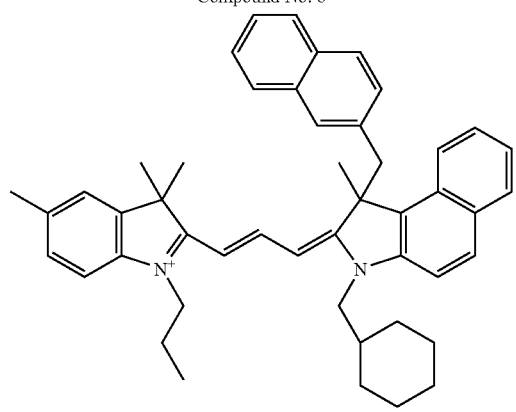
Compound No. 9
-continued
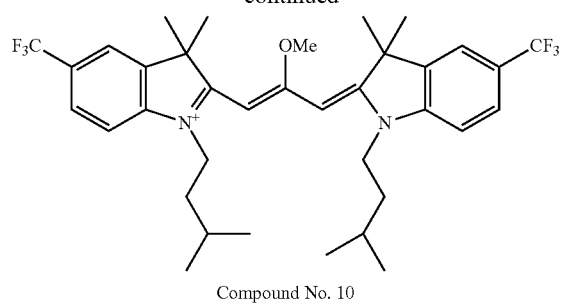
Compound No. 10
[Formula 9]
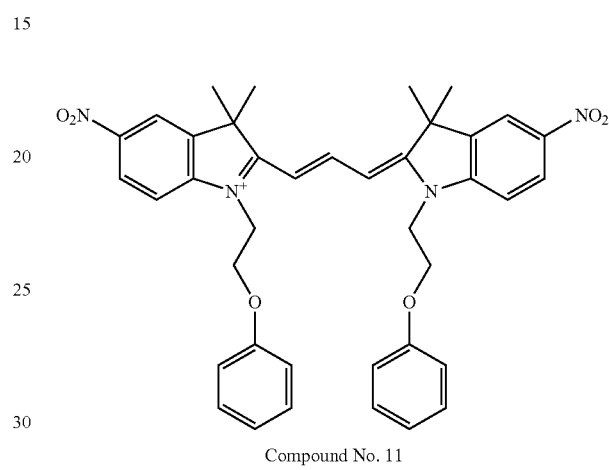
Compound No. 11
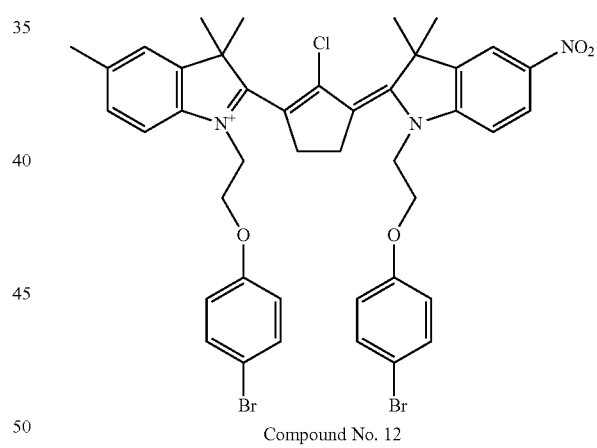
Compound No. 12
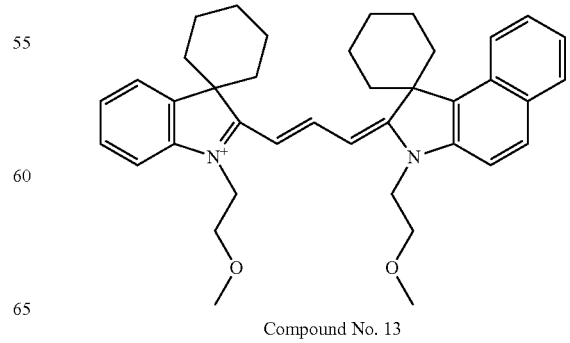
Compound No. 13

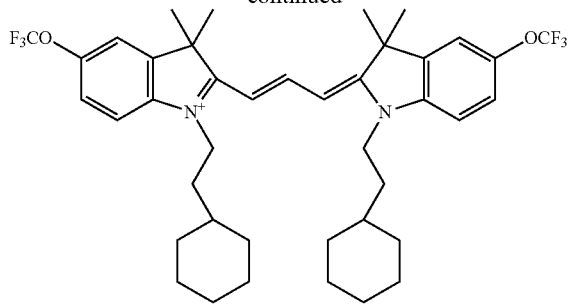
Compound No. 14
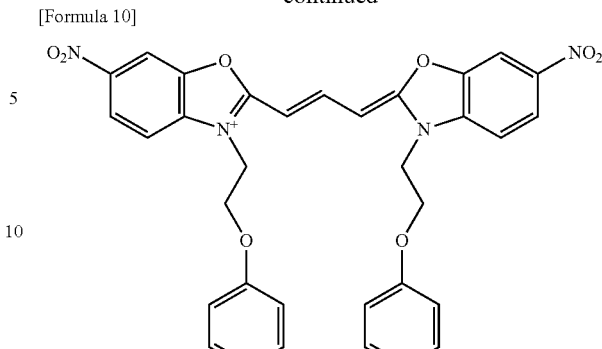
Compound No. 19
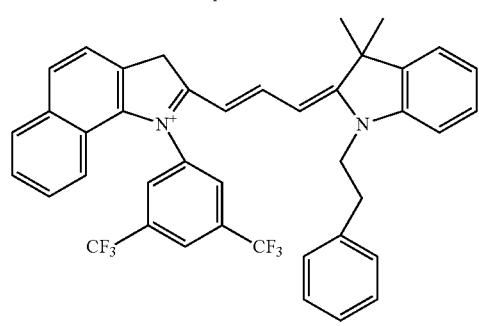
Compound No. 15
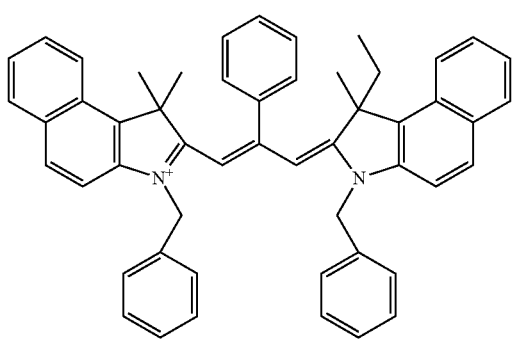
Compound No. 16
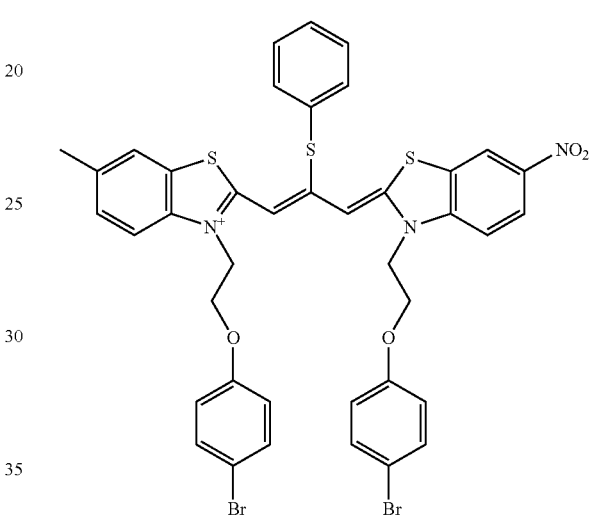
Compound No. 20
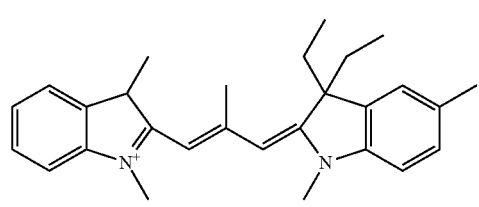
Compound No. 17
Compound No. 21
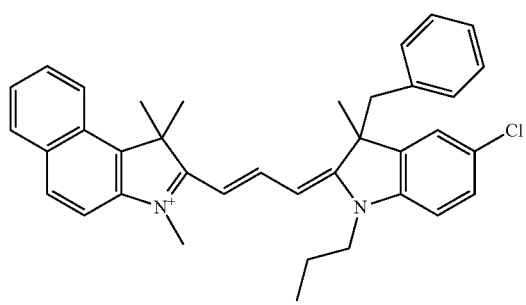
Compound No. 18
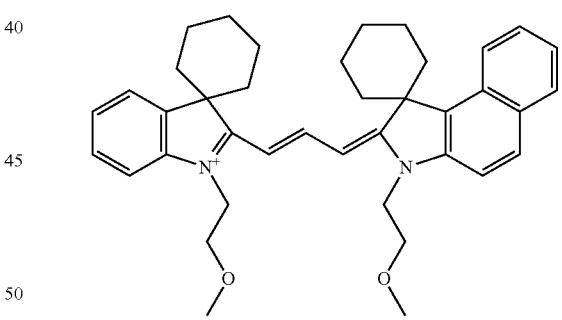
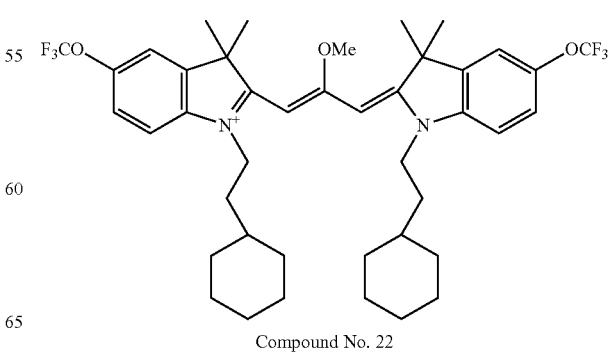
Compound No. 22

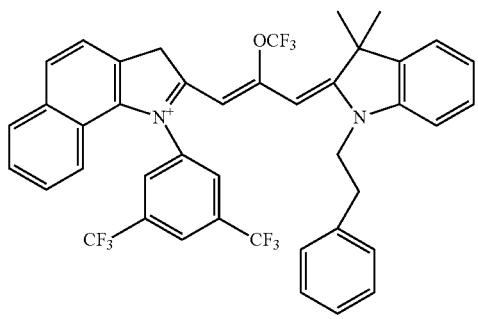
Compound No. 23
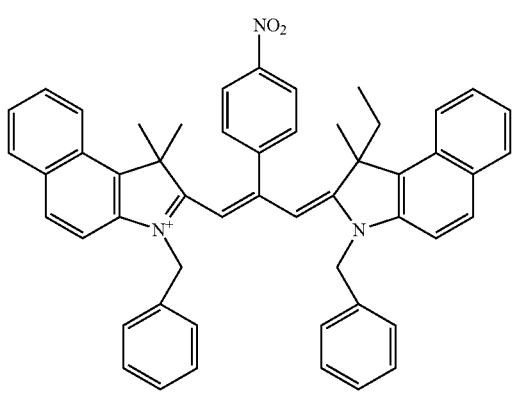
Compound No. 24
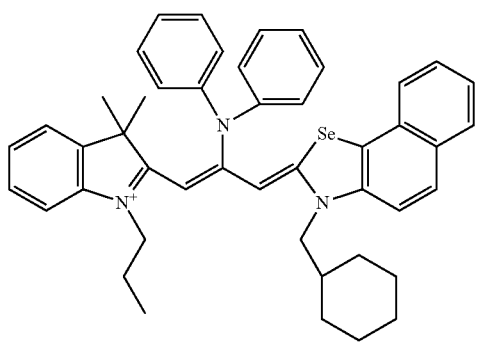
Compound No. 25
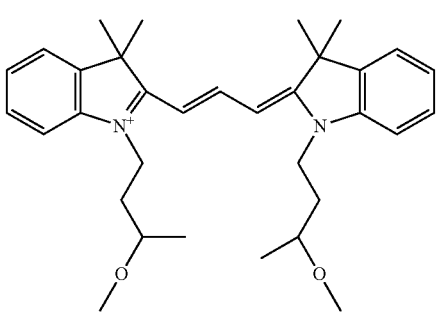
Compound No. 26
[Formula 11]
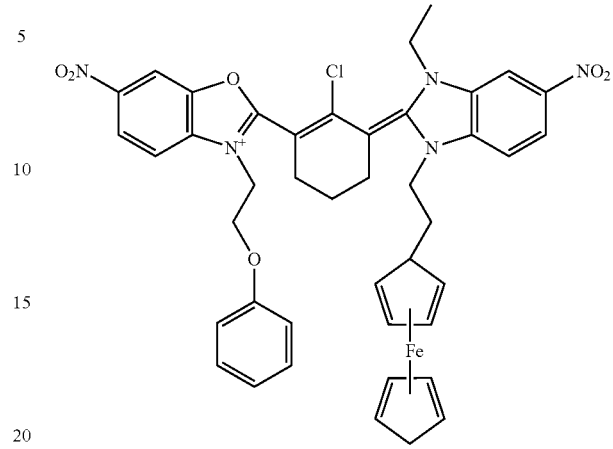
Compound No. 27
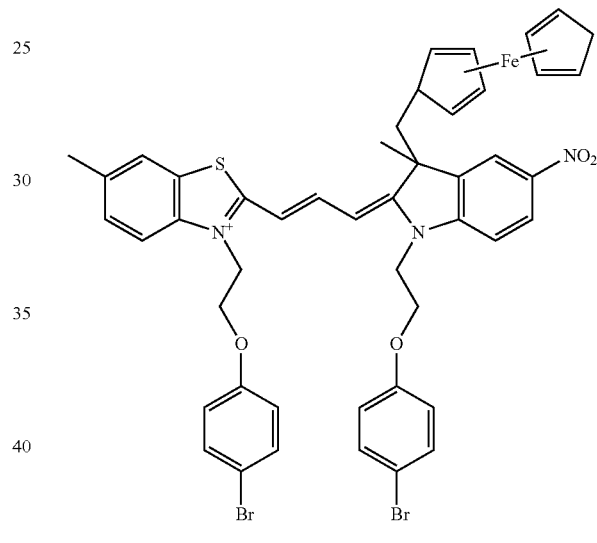
Compound No. 28
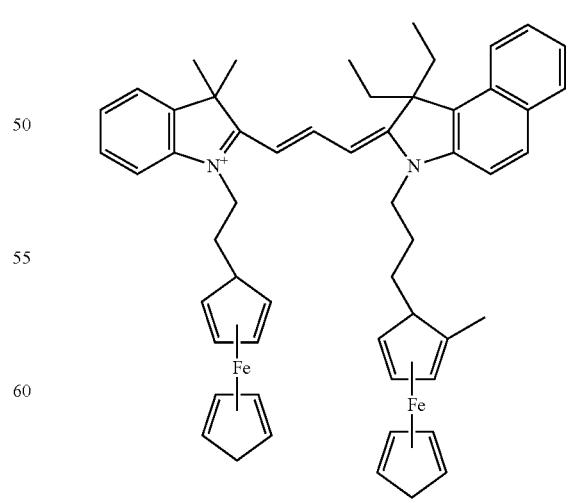
Compound No. 29

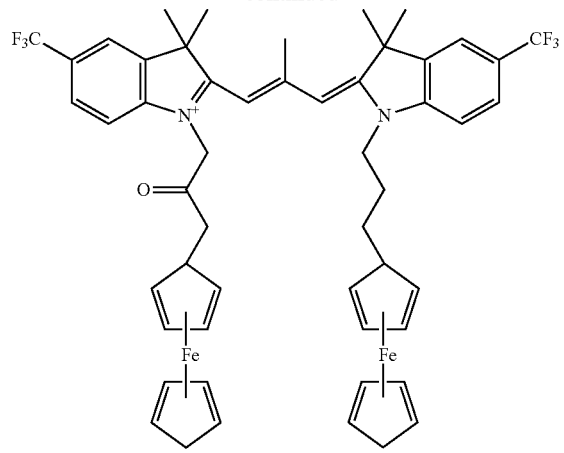
Compound No. 30
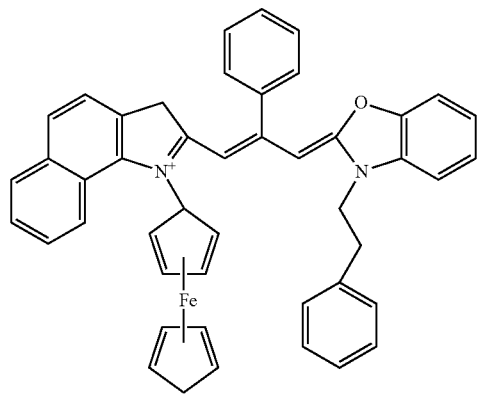
Compound No. 31
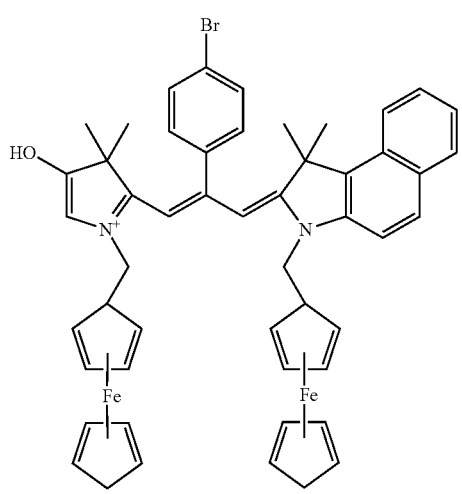
Compound No. 32
[Formula 12]
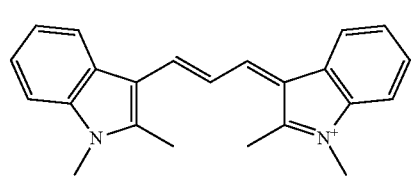
Compound No. 33
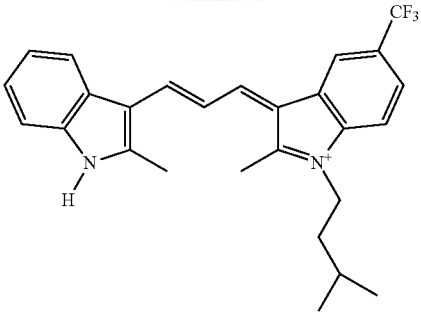
Compound No. 34
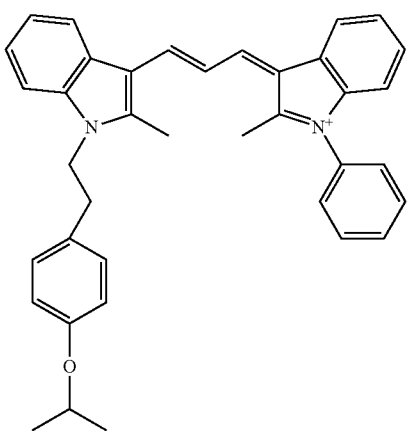
Compound No. 35
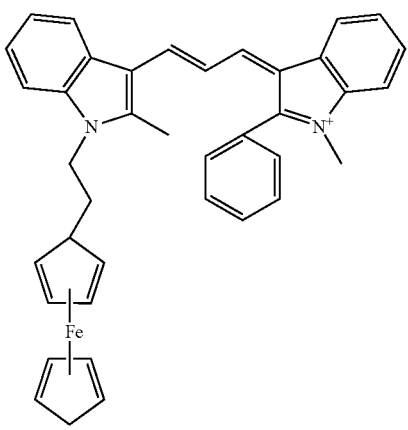
Compound No. 36
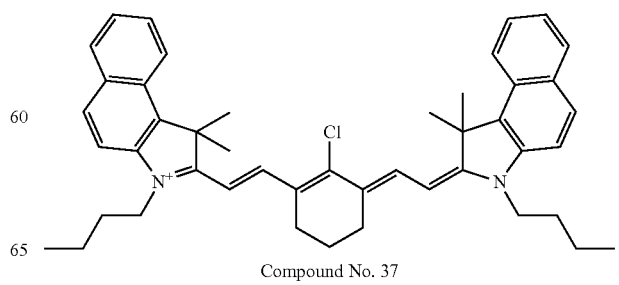
Compound No. 37

-continued
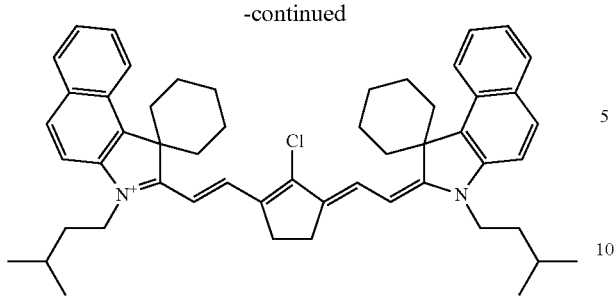
Compound No. 38
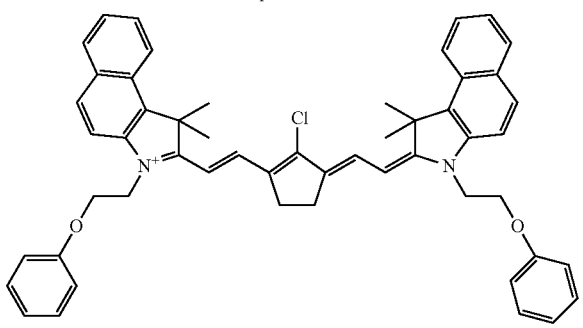
Compound No. 39
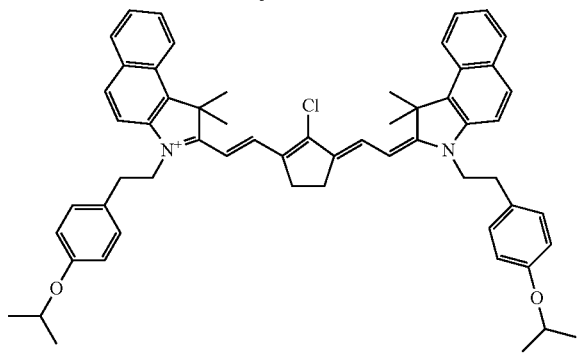
Compound No. 40
[Formula 13]
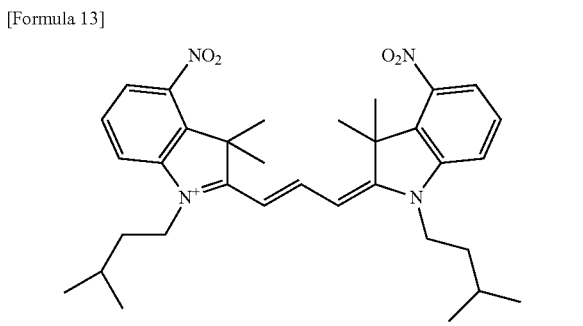
Compound No. 41
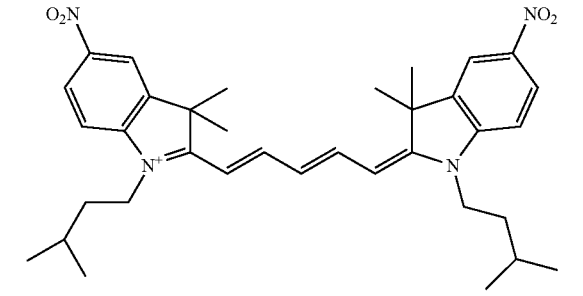
Compound No. 42
-continued
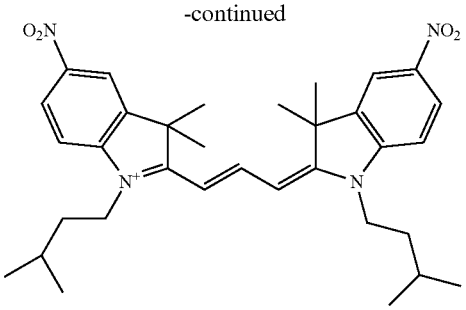
Compound No. 43
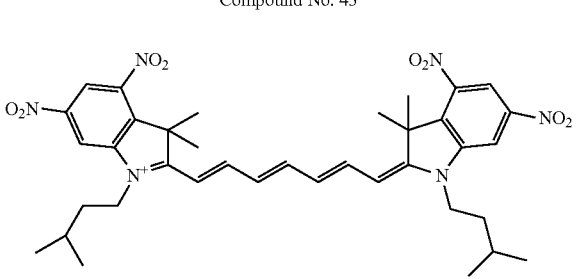
Compound No. 44
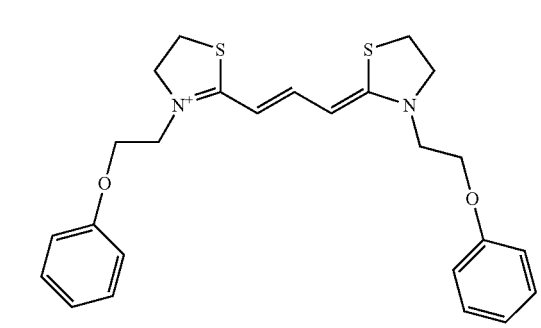
Compound No. 45
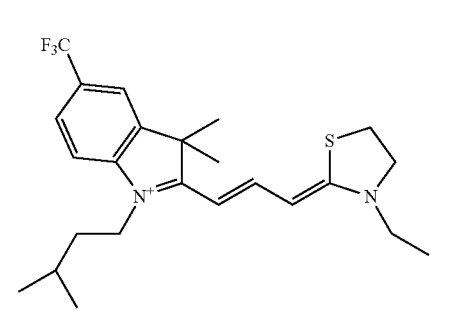
Compound No. 46
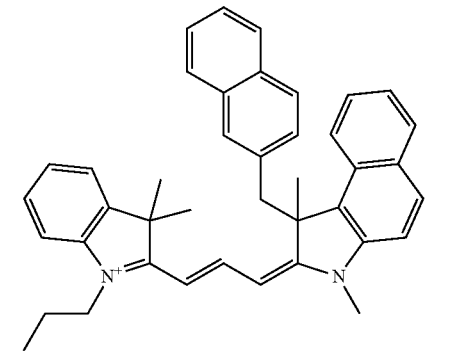
Compound No. 47

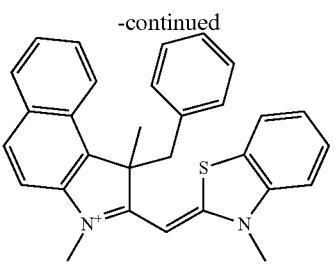

Compound No. 48

Among the cyanine compounds represented by (VII) above, the compounds represented by general formula (IV) below are particularly preferred for optical filters because of high moist heat resistance when incorporated in adhesive layers.

[Formula 14]

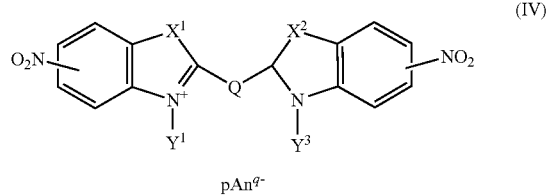

(In the formula, $Y^1$, $Y^3$, $X^1$, and $X^2$ are identical with those illustrated in (a) and (c) shown above as the group represented by ring A in general formula (I); and $An^{q-}$, p, q, and Q are identical with those in general formula (I).)

The above diimmonium compound specifically includes the compounds represented by general formula (V) below.

[Formula 15]

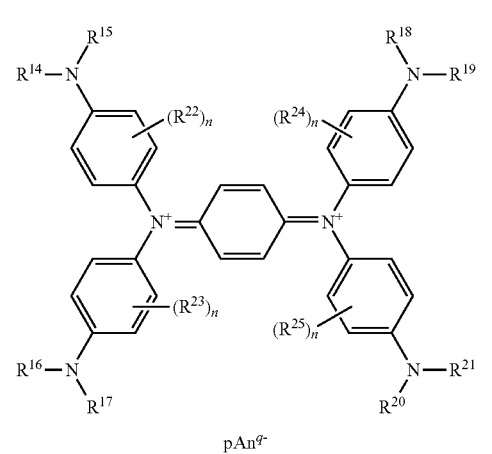

(In the formula, each of $R^{14}$, $R^{15}$, $R^{16}$, $R^{17}$, $R^{18}$, $R^{19}$, $R^{20}$, and $R^{21}$ independently represents a hydrogen atom or optionally substituted $C_{1-8}$ alkyl group; each of $R^{22}$, $R^{23}$, $R^{24}$, and $R^{25}$ independently represents a hydrogen atom, halogen atom, optionally substituted $C_{1-8}$ alkyl group, or optionally substituted amino group; (a) methylene group(s) in the alkyl group may be replaced by —O— or —CH=CH—; n represents a number of 1 to 4; and $An^{q-}$, p, q, and Q are identical with those in general formula (I).)

In general formula (V), the optionally substituted $C_{1-8}$ alkyl group represented by $R^{14}$, $R^{15}$, $R^{16}$, $R^{17}$, $R^{18}$, $R^{19}$, $R^{20}$, $R^{21}$, $R^{22}$, $R^{23}$, $R^{24}$, or $R^{25}$ includes the groups illustrated for $R^1$ to $R^9$ and others in general formula (I); the halogen atom represented by $R^{14}$, $R^{15}$, $R^{16}$, $R^{17}$, $R^{18}$, $R^{19}$, $R^{20}$, or $R^{21}$ includes the atoms illustrated for $R^1$ to $R^7$ and others in general formula (I); the optionally substituted amino group represented by $R^{14}$, $R^{15}$, $R^{16}$, $R^{17}$, $R^{18}$, $R^{19}$, $R^{20}$, or $R^{21}$ includes amino, ethylamino, dimethylamino, diethylamino, butylamino, cyclopentylamino, 2-ethylhexylamino, dodecylamino, anilino, chlorophenylamino, toluidino, anisidino, N-methylanilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, t-butoxycarbonylamino, n-octadecyloxycarbonylamino, N-methylmethoxycarbonylamino, phenoxycarbonylamino, sulfamoylamino, N,N-dimethylaminosulfonylamino, methylsulfonylamino, butylsulfonylamino, phenylsulfonylamino, and others.

In general formula (V), as the anion represented by $An^{q-}$, the anions illustrated for general formula (I) may be used without particular limitation. Among them, monovalent anions represented by general formula (VI) below are preferred because they are quite durable particularly in the initial stage and less affected by acids such as adhesives or bases such as layered clay minerals.

[Formula 16]

(In the formula, each of $R^{26}$ and $R^{27}$ independently represents an optionally halogenated $C_{1-8}$ alkyl group.)

Specific examples of the diimmonium compound represented by general formula (V) related to the present invention include Compounds No. 49 to No. 56 below. The following illustrations show only the diimmonium cations without any anions.

[Formula 17]

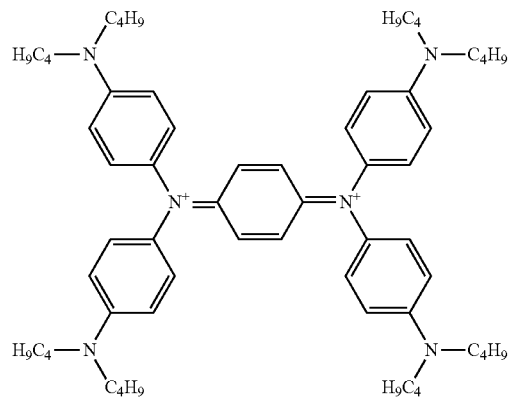

Compound No. 49

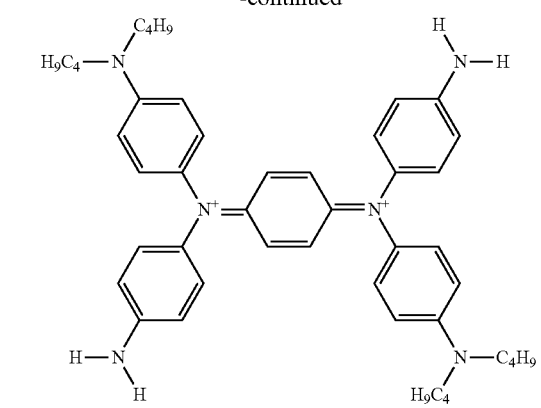

Compound No. 50

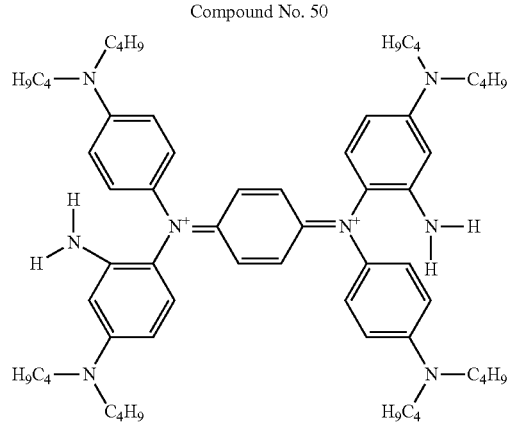

Compound No. 51

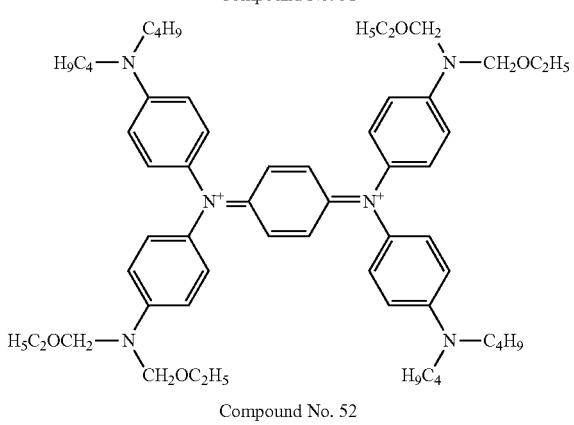

Compound No. 52

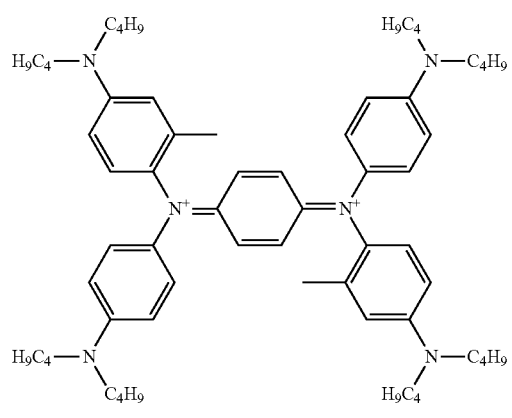

Compound No. 53

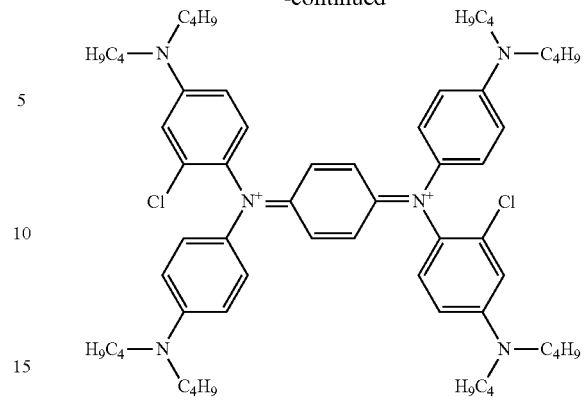

Compound No. 54

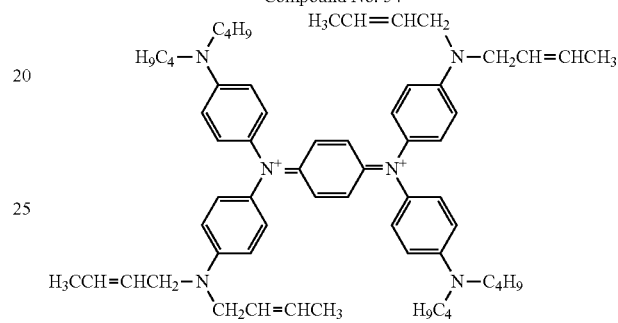

Compound No. 55

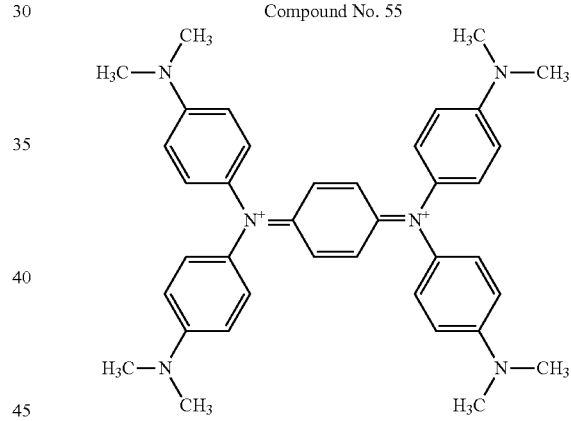

Compound No. 56

As the dye compound (i), both the cyanine compound represented by general formula (I) and the diimmonium compound represented by general formula (V) may be used in the same layer. Formation of one layer containing the both saves the number of steps and hence saves cost in manufacturing.

When both the cyanine compound represented by general formula (I) and the diimmonium compound represented by general formula (V) are used in the same layer, the amount of the diimmonium compound represented by general formula (V) is preferably 500 to 5000 parts by mass relative to 100 parts by mass of the cyanine compound represented by general formula (I) because of higher moist heat resistance and/or higher light resistance.

In the optical filter of the present invention, particularly optical filter for the image displays, the amount of the dye compound (i) related to the present invention used per unit area of the optical filter is generally 1 to 1000 mg/m$^2$, preferably 5 to 100 mg/m$^2$. When the amount is less than 1 mg/m$^2$, the effect of light absorption is insufficient, whereas with an amount exceeding 1000 mg/m², the color of the filter may be so strong as to deteriorate the display quality, and the lightness may also decrease. When the dye compound (i) related to the present invention is a mixture of a plurality of compounds, the amount of the dye compound (i) related to the present invention means the total amount thereof.

As the substrate in the optical filter of the present invention, the transparent supports described hereinafter are mainly used, and the transparent supports may be provided with an undercoat, anti-reflection, hardcoat, lubricating, or other layer as needed.

To adjust the amount of the dye compound (i) related to the present invention used per unit area of the optical filter to fall in the above range, the following method is generally adopted: for example, in manufacturing the optical filter of the present invention having an adhesive layer, 0.00001 to 1.0 part by mass, preferably 0.001 to 0.1 parts by mass of the dye compound (i), 0.0001 to 50 parts by mass, preferably 0.001 to 5.0 parts by mass of the layered clay mineral (ii), and 0.1 to 1000 parts by mass, preferably 1.0 to 500 parts by mass of a solvent such as methyl ethyl ketone are added relative to 100 parts by mass of the solid components in thermoplastic substance (iii) to prepare an adhesive solution, which is applied and dried on a transparent support such as PET film pretreated for facilitating adhesion, thereby forming the optical filter having an adhesive layer of 2 to 400 μm in thickness. To incorporate the essential and optional components related to the present invention into the optical filter of the present invention, the ratio of individual components may be determined in accordance with the above composition.

As the layered clay mineral (ii) related to the present invention, there may be used natural or chemically synthetic products, clay minerals containing lithium, sodium, calcium, or other ions between layers, ion-exchanged products and derivatives thereof, and mixtures thereof. Specific examples include smectites, kaolin minerals, micas, talc, chlorite, hydrotalcite, vermiculite, fluorovermiculite, and others. Smectites include hectrite, saponite, stevensite, beidellite, montmorillonite, bentonite, nontronite, and others; kaolin minerals include kaolinite, halloysite, nacrite, dickite, chrysotile, lizardite, amesite, pyroferrite, and others; and mica clay minerals include Li-tainiolite, Na-tainiolite, synthetic Na-tetrasilicic fluorine mica, and others. Among them, smectites and micas are preferred because of high functionality.

Among the smectites, preferred are purified smectites where impurities have been eliminated. Further preferred are lipophilic smectites with high affinity to polymer binders and organic solvents. One may use commercially available smectites, which include, for example, Lucentite SWN, SWF (hydrophilic smectite, manufactured by CO-OP Chemical Co., Ltd.), Lucentite STN, STN-A, SPN, SEN, SAN, SAN2C, SAN210, STF, SSN, SSN-A, SAN312-A, SAN2C-A, SAN210-A (lipophilic smectite, manufactured by CO-OP Chemical Co., Ltd.), Kunipia T (montmorillonite, manufactured by Kunimine Industries Co., Ltd.), S-Ben N-400, S-Ben N-400FP (montmorillonite, manufactured by Hojun Co., Ltd.), Benton (Toshin Chemicals Co., Ltd.), and others. Among them, preferred are purified STN-A, SSN-A, SAN-312-A, SAN2C, and SAN210 where impurities have been eliminated because they hardly agglomerate when mixed with the dye compound.

Among the micas, preferred are purified micas where impurities have been eliminated. Further preferred are swelling micas with high affinity to polymer binders and organic solvents.

One may use commercially available micas, which include, for example, Somacif (swelling mica, manufactured by CO-OP Chemical Co., Ltd) and Micromica (non-swelling mica, manufactured by CO-OP Chemical Co., Ltd.).

The layered clay mineral (ii) related to the present invention, when hydrophilic, may be modified before use to make hydrophobic by Method (I) or (II). That is, (I) the layered clay mineral is dispersed in water to prepare a suspension, interlayer ions in the layered clay mineral are exchanged with organic cations, this liquid dispersion is treated with an acid in a quantity enough to make the dispersion weakly basic to acidic, and the resultant product is isolated and dried or (II) the layered clay mineral is dispersed in water, the dispersion is treated with an acid in a quantity enough to make the dispersion weakly basic to acidic, the acid-treated layered clay mineral is dispersed in water to prepare a suspension, interlayer ions in the layered clay mineral are exchanged with organic cations, and the resultant product is isolated and dried.

Here, the product obtained could be used even without isolation and drying, but it is undesirable because moist heat resistance of the optical filter obtained decreases.

The above organic cations include quaternary ammonium ions, phosphonium ions, and others.

The quaternary ammonium ion preferably has alkyl, aryl, or aralkyl groups. In particular, quaternary ammonium ions having $C_{1-20}$ alkyl groups, $C_{6-30}$ aryl groups, or $C_{7-30}$ aralkyl groups are preferred because the layered clay mineral modified with such ions has high affinity to organic solvents when such ions are exchanged with the dye compound (i) and because dispersions of such modified minerals in organic solvents have suitable viscosity. The quaternary ammonium ions specifically include tetramethylammonium, tetraethylammonium, tetra-n-decylammonium, tetra-n-dodecylammonium, trioctylmethylammonium, trimethylstearylammonium, dimethyldistearylammonium, trioctylmethyl ammonium, dimethyldioctadecylammonium, dimethyldidecylammonium, dimethylstearylbenzylammonium, ions represented by [Formula 18] below, and others.

The above phosphonium ions include, for example, alkylphosphonium, arylphosphonium, and others.

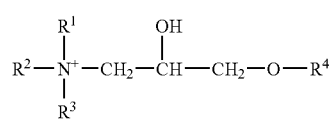

[Formula 18]

(In the formula, each of $R^{34}$, $R^{35}$, $R^{36}$, and $R^{37}$ independently represents a $C_{1-20}$ alkyl group.)

In either of Methods (I) and (II) described above, the acid used in the acid-treatment of the layered clay mineral is not particularly limited. Examples include mineral acids such as sulfuric acid, hydrochloric acid, and nitric acid and organic acids such as citric acid and acetic acid.

The blending ratio of the layered clay mineral (ii) related to the present invention is preferably 0.1 to 100 parts, particularly preferably 1.0 to 30 parts, relative to 1 part of the dye compound (i) of the present invention. With less than 0.1 parts, the stabilization effect is insufficient, whereas use of more than 100 parts causes viscosity increase or particle agglomeration when these components are dispersed in an organic solvent, which possibly impairs physical properties of the optical filter.

As the thermoplastic substance (iii) related to the present invention, usable substances include thermoplastic resins of natural macromolecules such as gelatin, casein, starch, cellulose derivatives, and alginic acid or synthetic polymers such as polymethyl methacrylate, poly(vinyltoluene-co-acrylate), polyvinylbutyral, polyvinyl acetal, polyvinylpyrrolidone, polyvinyl alcohol, polyvinyl chloride, poly(styrene-co-acrylate), styrene-butadiene copolymer, polystyrene, polycarbonate, polyamide, polyurethane, polyester, polycaprolactone, and polyacrylonitrile; and also known clear adhesives for glass laminates such as silicone adhesives, urethane adhesives, acrylic adhesives, polyvinylbutyral adhesives, polyvinyl ether adhesives, ethylene-vinyl acetate adhesives, polyolefin adhesives, SBR adhesives, and rubber-based adhesives. Particularly, acrylic adhesives, above all, acidic acrylic adhesives are preferably used.

One may use, together with the thermoplastic substance (iii), organic solvents, tackifiers, softeners, ultraviolet absorbers, antioxidants, plasticizers, antifoaming agents, leveling agents, dispersants, and others.

The above acrylic adhesives are not particularly limited, and usable ones include homopolymers or copolymer of (a) monomer(s) that has/have a reactive functional group such as carboxyl, hydroxyl, amide, amino, and epoxy groups and an ethylenic unsaturated double bond, copolymers of the above monomer having a reactive functional group and an ethylenic unsaturated double bond with a monomer having an ethylenic unsaturated double bond such as (meth)acrylic monomers and vinyl monomers. Such adhesives may contain, if needed for enhancing cohesion thereof, crosslinkers serving as curing agents such as metal chelate-type crosslinkers, isocyanate-type crosslinkers, melamine-type crosslinkers, epoxy-type crosslinkers, amine-type crosslinkers, aziridine-type crosslinkers, and oxazoline-type crosslinkers.

As the acrylic adhesive, one may use commercially available products, which include, for example, DB Bond 5541 (manufactured by Diabond Industry Co., Ltd.), SK-DYNE AS-1925, KP-2230, SK-1811L (manufactured by Soken Chemical & Engineering Co., Ltd.), DX2-PDP-19 (manufactured by Nippon Shokubai Co., Ltd.), AT-3001 (manufactured by Saiden Chemical Industry Co., Ltd.), ORIBAIN BPS5896 (manufactured by Toyo Ink Mfg. Co., Ltd.), CS-9611 (manufactured by Nitto Denko Corporation), and others.

As a method to incorporate the dye compound (i) related to the present invention, layered clay mineral (ii), thermoplastic substance (iii), and optional components such as light absorbers other than the dye compound (i) related to the present invention and various stabilizers into the optical filter of the present invention, when these components are incorporated into an adhesive layer provided between any two adjacent layers selected from the transparent support and optional layers, the dye compound (i) related to the present invention and others are mixed with an adhesive, and then the above two adjacent layers among the transparent support and optional layers are bonded with this adhesive. On the surface of the adhesive layer, there may be further provided a known separator film such as polyethylene terephthalate film pre-treated for facilitating adhesion.

The thickness of the adhesive layer is 2 to 400 μm, preferably 5 to 40 μm.

The optical filter of the present invention can be used for image display devices such as liquid crystal displays (LCD), plasma display panels (PDP), electroluminescence displays (ELD), cathode-ray tube displays (CRT), fluorescent display tubes, and field emission displays, for analytical instruments, in manufacturing semiconductor devices, for astronomical observation, for optical communication, in spectacle lenses, windows, and others.

When applied to an image display device, the optical filter of the present invention is generally disposed on the front of the display. For example, the optical filter may be directly bonded to the surface of the display. When a front panel or an electromagnetic shield is disposed in front of the display, the optical filter may be bonded to the front (outside) or rear (display side) of the front panel or electromagnetic shield.

When used for an image display, the optical filter of the present invention may contain a light absorbers for light at wavelength except 480 to 500 nm for adjusting color hue or may contain a light absorber for 480- to 500-nm light other than the dye compounds related to the present invention for preventing reflection or glare of external light. When the image display device is a plasma display, a near-infrared absorber for 750- to 1100-nm light other than the dye compound related to the present invention may be used.

The light absorber for adjusting color hue, when used for eliminating orange light at 550 to 600 nm, includes trimethinecyanine derivatives such as trimethine indolium compounds, trimethine benzoxazolium compounds, and trimethine benzothiazolium compounds, pentamethinecyanine derivatives such as pentamethine oxazolium compounds and pentamethine thiazolium compounds, squarilium dyes, azomethine dyes, xanthene dyes, azo dyes, pyromethene dyes, azo metal complexes, rhodamine dyes, phthalocyanines, porphyrins, dipyromethene metal chelates, and others.

The light absorber for 480- to 500-nm light for preventing glare due to external light includes trimethinecyanine derivatives such as trimethine indolium compounds, trimethine oxazolium compounds, trimethine thiazolium compounds, and indolidene trimethine thiazonium compounds, phthalocyanines, naphthalocyanines, porphyrins, dipyromethene metal chelates, and others.

The near-infrared absorber for 750- to 1100-nm light for preventing malfunction of infrared remote controllers includes pentamethinecyanine derivatives such as pentamethine benzoindolium compounds, pentamethine benzoxazolium compounds, and pentamethine benzothiazolium compounds; heptamethinecyanine derivatives such as heptamethine indolium compounds, heptamethine benzoindolium compounds, heptamethine oxazolium compounds, heptamethine benzoxazolium compounds, heptamethine thiazolium compounds, and heptamethine benzothiazolium compounds; squarilium derivatives; nickel complexes such as bis(stilbenedithiolato)nickel, bis(benzenedithiolato)nickel, and bis(camphordithiolato)nickel; squarilium derivatives; azo dye derivatives; phthalocyanine derivatives; porphyrin derivatives; dipyromethene metal chelates; and others.

In the optical filter of the present invention, the above light absorber for adjusting color hue, the light absorber for 480 to 500-nm light, and the near-infrared absorber may be contained in the same layer as the layer containing the dye compound related to the present invention or may be in a layer different therefrom. The amount of each absorber used per unit area of the optical filter is generally in a range of 1 to 1000 mg/m$^2$, preferably 5 to 100 mg/m$^2$.

A typical configuration of the optical filter of the present invention includes a transparent support, on which an undercoat layer, antireflection layer, hardcoat layer, lubricating layer, or other layer is disposed as needed. As the method to incorporate the dye compound (i) related to the present invention, the layered clay mineral (ii), the thermoplastic substance (iii), and optional components such as the light absorber except the dye compound (i) related to the present invention and various stabilizers into the optical filters of the present invention, preferred is a method of incorporating these components in an adhesive layer between any two adjacent layers selected from the transparent support and the optional layers.

Materials for the transparent support include, for example, inorganic materials such as glass; cellulose esters such as diacetyl cellulose, triacetyl cellulose (TAC), propionyl cellulose, butyryl cellulose, acetylpropionyl cellulose, and nitrocellulose; polyamide; polyimide; polyurethane; epoxy resin; polycarbonate; polyesters such as polyethylene terephthalate, polyethylene naphthalate, polybutylene terephthalate, poly(1,4-cyclohexanedimethylene)terephthalate, polyethylene-1,2-diphenoxyethane-4,4'-dicarboxylate and polybutylene terephthalate; polyolefins such as polystyrene, polyethylene, polypropylene, and polymethylpentene; polyvinyl compounds such as polyvinyl acetate, polyvinyl chloride, and polyvinyl fluoride; acrylic resins such as polymethyl methacrylate and polyacrylic esters; polycarbonate; polysulfone; polyethersulfone; polyetherketone, polyetherimide, polyoxyethylene; norbornene resins; and other polymers. The transmittance of the transparent support is preferably 80% or higher, and more preferably 86% or higher. The haze thereof is preferably 2% or less, and more preferably 1% or less. The refractive index thereof is preferably 1.45 to 1.70.

The transparent support may contain infrared absorbers, ultraviolet absorbers, antioxidants such as phenolic or phosphorous-containing antioxidants, flame retardants, lubricants, antistatic agents, inorganic fine particles, and others. The transparent support may be surface-treated in various ways.

The above inorganic fine particles include, for example, silicon dioxide, titanium dioxide, barium sulfate, calcium carbonate, and others.

The above surface treatment includes, for example, chemical treatment, mechanical treatment, corona discharge treatment, flame treatment, ultraviolet irradiation, microwave irradiation, glow discharge treatment, active plasma treatment, laser treatment, treatment with mixed acid, ozone oxidation, and others.

The above undercoat layer is a layer used between the transparent support and a light-absorbing layer in disposing the light-absorbing layer containing the light absorber. The undercoat layer is a layer comprising a polymer with glass transition temperature of −60 to 60° C., a layer with rough surface facing the light-absorbing layer, or a layer comprising a polymer with good affinity to the polymer in the light-absorbing layer. The undercoat layer may be also disposed on the surface of the transparent support on which the light-absorbing layer is not disposed to enhance adhesion between the transparent support and the layer disposed thereon (for example, antireflection layer, hardcoat layer) or may be disposed to increase the affinity between the optical filter and an adhesive to adhere the optical filter to an image display device. The thickness of the undercoat layer is preferably 2 nm to 20 μm, more preferably 5 nm to 5 μm, further preferably 20 nm to 2 μm, still more preferably 50 to 1 μm, and most preferably 80 nm to 300 nm. The undercoat layer comprising a polymer with glass transition temperature of −60 to 60° C. binds the transparent support and the filter layer based on stickiness of the polymer. A polymer with glass transition temperature of −60 to 60° C. can be obtained, for example, by polymerization of vinyl chloride, vinyldene chloride, vinyl acetate, butadiene, neoprene, styrene, chloroprene, acrylic esters, methacrylic esters, acrylonitrile, or methyl vinyl ether or by copolymerization thereof. The glass transition temperature is preferably 50° C. or below, more preferably 40° C. or below, further preferably 30° C. or below, still more preferably 25° C. or below, and most preferably 20° C. or below. The elastic modulus of the undercoat layer at 25° C. is preferably 1 to 1000 MPa, further preferably 5 to 800 MPa, and most preferably 10 to 500 MPa. The undercoat layer with rough surface facing the light-absorbing layer is used to bind the transparent support and the light-absorbing layer by forming the light-absorbing layer on the rough surface. The undercoat layer with rough surface facing the light-absorbing layer is readily formed by coating with polymer latex. The average particle diameter of the latex is preferably 0.02 to 3 μm, and further preferably 0.05 to 1 μm. The polymer with good affinity to the binder polymer in the light-absorbing layer includes acrylic resins, cellulose derivatives, gelatin, casein, starch, polyvinyl alcohol, soluble nylon, polymer latex, and others. Two or more undercoat layers may be disposed in the optical filter of the present invention. The undercoat layer may contain solvents to swell the transparent support, matting agents, surfactants, antistatic agents, coating aids, film hardeners, and others.

A low-refractive-index layer is essential in the above antireflection layer. The refractive index of the low-refractive-index layer is lower than that of the transparent support. The refractive index of the low-refractive-index layer is preferably 1.20 to 1.55, and more preferably 1.30 to 1.50. The thickness of the low-refractive-index layer is preferably 50 to 400 nm, and further preferably 50 to 200 nm. The low-refractive-index layer can be formed as a layer made of fluorine-containing polymer with low refractive index (described in each gazette of Japanese Patent Laid-Open Publication S57-34526, Japanese Patent Laid-Open Publication H3-130103, Japanese Patent Laid-Open Publication H6-115023, Japanese Patent Laid-Open Publication H8-313702, and Japanese Patent Laid-Open Publication H7-168004), as a layer obtained by a sol-gel process (described in Japanese Patent Laid-Open Publication H5-208811, Japanese Patent Laid-Open Publication H6-299091, and Japanese Patent Laid-Open Publication H7-168003), as a layer containing fine particles (described in Japanese Patent Laid-Open Publication S60-59250, Japanese Patent Laid-Open Publication H5-13021, Japanese Patent Laid-Open Publication H6-56478, Japanese Patent Laid-Open Publication H7-92306, and Japanese Patent Laid-Open Publication H9-288201). In the low-refractive-index layer containing fine particles, pores can be formed in the layer as microvoids between or within the fine particles. The porosity of the layer containing fine particles is preferably 3 to 50 vol %, and further preferably 5 to 35 vol %.

In order to prevent reflection in a wide range of wavelength, the antireflection layer preferably has a layer with high refractive index (medium- or high-refractive-index layer) stacked in addition to the low-refractive-index layer. The refractive index of the high-refractive-index layer is preferably 1.65 to 2.40, and more preferably 1.70 to 2.20. The refractive index of the medium-refractive-index layer is adjusted to an intermediate value between the refractive index of the low-refractive-index layer and that of the high-refractive-index layer. The refractive index of the medium-refractive-index layer is preferably 1.50 to 1.90, and more preferably 1.55 to 1.70. The thickness of the medium- or high-refractive-index layer is preferably 5 nm to 100 μm, more preferably 10 nm to 10 μm, and most preferably 30 nm to 1 μm. The haze of the medium- or high-refractive-index layer is preferably 5% or less, more preferably 3% or less, and most preferably 1% or less. The medium- and high-refractive-index layer can be formed using polymer binder with relatively high refractive index. The polymer with high refractive index includes polystyrene, styrene copolymers, polycarbonate, melamine resins, acrylic resins, phenol resins, epoxy resins, polyurethanes obtained by reaction of cyclic (alicyclic or aromatic) isocyanates with polyols, and others. Other polymers having cyclic (aromatic, heterocyclic, or alicyclic) groups and polymers substituted with halogen atoms except fluorine also have high refractive index. One may also use a polymer formed by polymerizing a monomer having an additional double bond to enable radical curing.

Inorganic fine particles may be dispersed in the above polymer binders in order to obtain further higher refractive index. The refractive index of the inorganic fine particles is preferably 1.80 to 2.80. The inorganic fine particles are preferably formed from metal oxides or sulfides. The metal oxide or sulfides include titanium oxide (for example, rutile, rutile/anatase mixed phase, anatase, amorphous), tin oxide, indium oxide, zinc oxide, zirconium oxide, zinc sulfide, and others. Among them, titanium oxide, tin oxide, and indium oxide are particularly preferred. The inorganic fine particles are composed of a metal oxide or sulfide as a major component, but may further contain another element. The major component herein means the component with the highest content (wt %) among the components constituting the particles. Another element includes Ti, Zr, Sn, Sb, Cu, Fe, Mn, Pb, Cd, As, Cr, Hg, Zn, Al, Mg, Si, P, S, and others. The medium- or high-refractive-index layer may be formed using an inorganic material that is film-forming and dispersible in solvents or inorganic material that is liquid itself, for example, alkoxides, organic acids salt, or coordination compounds bonded to ligands (for example, chelate compounds) of various elements; or active inorganic polymers.

The surface of the antireflection layer may have antiglare function (function of scattering incident light at the surface to prevent the scene around the film from mirroring in the film surface). The antireflection layer with antiglare function can be obtained, for example, by forming the antireflection layer on the surface of a transparent film where fine bumpiness is formed or by making the surface of a pre-formed antireflection layer bumpy with embossing rolls. The antireflection layer with antiglare function generally has haze of 3 to 30%.

The hardcoat layer has hardness higher than that of the transparent support. The hardcoat layer preferably contains a crosslinked polymer. The hardcoat layer may be formed using an acrylic, urethane, or epoxy-type polymer, oligomer, or monomer (for example, ultraviolet-curable resin), or the like. The hardcoat layer may be formed from silica-type materials.

The lubricating layer may be formed on the surface of the antireflection layer (low-refractive-index layer). The lubricating layer gives the surface of the low-refractive-index layer slipping properties to improve its scratch resistance. The lubricating layer may be formed using polyorganosiloxane (for example, silicone oil), natural wax, petroleum wax, metal salts of higher fatty acids, fluorine-containing lubricants, or derivatives thereof. The thickness of the lubricating layer is preferably 2 to 20 nm.

The above organic solvent is not particularly limited. There may be used accordingly various known solvents, for example, alcohols such as isopropanol; ether alcohols such as methylcellosolve, ethylcellosolve, butylcellosolve, and butyl diglycol; ketones such as acetone, methyl ethyl ketone, methyl isobutyl ketone, cyclohexanone, and diacetone alcohol; esters such as ethyl acetate, butyl acetate, and methoxyethyl acetate; acrylic esters such as ethyl acrylate and butyl acrylate; fluorinated alcohols such as 2,2,3,3-tetrafluoropropanol; hydrocarbons such as hexane, benzene, toluene, and xylene; chlorohydrocarbons such as methylene chloride, dichloroethane, and chloroform; and others. These organic solvents may be used singly or as a mixture.

General coating methods may be used for forming the undercoat layer, antireflection layer, hardcoat layer, lubricating layer, light-absorbing layer, adhesive layer, and others. The coating methods include dip coating, air knife coating, curtain coating, roller coating, wire-bar coating, gravure coating, and extrusion coating using a hopper (described in the specification of U.S. Pat. No. 2,681,294), and others. Two or more layers may be formed by simultaneous coating. The simultaneous coating method is described in U.S. Pat. No. 2,761,791, U.S. Pat. No. 2,941,898, U.S. Pat. No. 3,508,947, U.S. Pat. No. 3,526,528, and "Coating Engineering" by Yuji Harasaki, p. 253, Asakura Publishing Co., Ltd. (1973).

EXAMPLES

Hereafter, the present invention will be further detailed with Evaluation examples, Comparative evaluation examples, and Examples. The present invention is however not limited in any way by Examples and others below.

Evaluation Examples 1 to 5

Evaluation of Light Resistance and Moist Heat Resistance

Each adhesive solution prepared with the following composition was applied to a 188-μm thick polyethylene terephthalate (PET) film pretreated for facilitating adhesion using a bar coater #30 and then dried at 100° C. for 10 minutes. On the coated surface, a 0.9-mm thick glass plate was laminated to prepare a specimen.

<Evaluation of Light Resistance>

For each specimen obtained above, the transmittance was measured at $\lambda_{max}$ in the UV/Vis/NIR absorption spectrum. Subsequently, the specimen was irradiated with light of 55000 lux for 50 hours (150 hours for Evaluation examples 4 and 5) and the transmittance was again measured at $\lambda_{max}$ in the UV/Vis/NIR absorption spectrum (in Evaluation example 5, the transmittance was measured at each $\lambda_{max}$ in visible and near infrared regions of the UV/Vis/NIR absorption spectrum). The percentage of the transmittance after irradiation to the transmittance before irradiation rated as 100 was determined as an index for evaluating light resistance. The results are shown in Tables 1 to 5.

<Evaluation of Moist Heat Resistance>

For each specimen obtained above, the transmittance was measured at $\lambda_{max}$ in the UV/Vis/NIR absorption spectrum. Subsequently the specimen was kept for 50 hours in a constant-temperature/humidity chamber at a constant temperature of 60° C. under a constant humidity of 90% RH, and then the transmittance was measured again at $\lambda_{max}$ in the UV/Vis/NIR absorption spectrum. The percentage of the transmittance after test to the transmittance before test was calculated as an index for evaluating moist heat resistance. The results are shown in Tables 1 to 5.

Composition of Evaluation Example 1

Perchlorate of Compound No. 1: 2.00 mg
Smectite or mica: Amount described in Table 1
Acrylic adhesive (DB Bond 5541; Diabond Industry Co., Ltd.): 4.68 g
Methyl ethyl ketone: 1.99 g

TABLE 1

|  | Smectite or mica | Amount added (mg) | Light resistance (%) | Moist heat resistance (%) |
|---|---|---|---|---|
| Evaluation example 1-1 | Lucentite STN | 2.00 | 75.9 | 44.5 |
| Evaluation example 1-2 | Lucentite STN | 4.00 | 81.7 | 60.4 |
| Evaluation example 1-3 | Lucentite STN | 10.0 | 89.2 | 87.9 |
| Evaluation example 1-4 | Lucentite STN | 20.0 | 78.1 | 86.5 |
| Evaluation example 1-5 | Lucentite STN | 40.0 | 77.2 | 83.1 |
| Evaluation example 1-6 | Lucentite STN | 100 | 74.1 | 88.9 |
| Evaluation example 1-7 | Lucentite SPN | 10.0 | 77.1 | 54.2 |
| Evaluation example 1-8 | Somacif | 10.0 | 75.2 | 49.1 |
| Comparative evaluation example 1-1 | — | — | 69.6 | 20.5 |
| Comparative evaluation example 1-2 | Silver chloride | 10.0 | 68.4 | 9.5 |
| Comparative evaluation example 1-3 | Silver bromide | 10.0 | 67.8 | 9.4 |
| Comparative evaluation example 1-4 | Silver iodide | 10.0 | 68.5 | 9.7 |

* Lucentite STN (lipophilic smectite; manufactured by CO-OP Chemical Co., Ltd.)
Somacif (swelling mica; manufactured by CO-OP Chemical Co. Ltd.)

Composition of Evaluation Example 2

Hexafluorophosphate of Compound No. 4: 2.00 mg
Smectite or mica: Amount described in Table 2
Acrylic adhesive (DB Bond 5541; Diabond Industry Co., Ltd.): 4.68 g
Methyl ethyl ketone: 1.99 g

TABLE 2

|  | Smectite or mica | Amount added (mg) | Light resistance (%) | Moist heat resistance (%) |
|---|---|---|---|---|
| Evaluation example 2-1 | Lucentite STN | 10.0 | 68.0 | 85.0 |
| Evaluation example 2-2 | Lucentite STN | 20.0 | 70.2 | 76.2 |
| Evaluation example 2-3 | Lucentite STN | 100 | 68.9 | 82.4 |
| Comparative evaluation example 2-1 | — | — | 64.4 | 53.5 |
| Comparative evaluation example 2-2 | Silver iodide | 10.0 | 53.6 | 7.8 |

Composition of Evaluation Example 3

Cyanine compound (described in Table 3): 2.00 mg
Smectite(**) (Lipophilic smectite: Lucentite SSN; manufactured by CO-OP Chemical Co., Ltd.):20.0 mg
Acrylic adhesive (DB Bond 5541; manufactured by Diabond Industry Co., Ltd.): 4.68 g
Methyl ethyl ketone: 1.99 g

TABLE 3

|  | Cyanine compound | Smectite | Light resistance (%) | Moist heat resistance (%) |
|---|---|---|---|---|
| Evaluation example 3-1 | Compound No 1 ($ClO_4^-$ salt) | Present | 97.3 | 97.9 |
| Evaluation example 3-2 | Compound No. 41 ($ClO_4^-$ salt) | Present | 91.9 | 95.2 |
| Evaluation example 3-3 | Compound No. 42 ($ClO_4^-$ salt) | Present | 93.2 | 97.0 |
| Evaluation example 3-4 | Compound No. 43 ($ClO_4^-$ salt) | Present | 96.5 | 98.7 |
| Comparative evaluation example 3-1 | Compound No. 1 ($ClO_4^-$ salt) | Absent | 88.5 | 79.5 |
| Comparative evaluation example 3-2 | Compound No. 41 ($ClO_4^-$ salt) | Absent | 88.3 | 93.4 |
| Comparative evaluation example 3-3 | Compound No. 42 ($ClO_4^-$ salt) | Absent | 76.6 | 64.9 |
| Comparative evaluation example 3-4 | Compound No. 43 ($ClO_4^-$ salt) | Absent | 88.7 | 78.6 |

** No smectite was added in Comparative evaluation examples 3-1 to 3-4.

Composition of Evaluation Example 4

Bistrifluoromethylsulfonylimide salt of Compound No. 49: 25 mg
Smectite** (Lipophilic smectite: Lucentite SSN-A; manufactured by CO-OP Chemical Co., Ltd.): Amount described in Table 4
Acrylic adhesive (DB Bond 5541; manufactured by Diabond Industry Co., Ltd.): 4.68 g
Methyl ethyl ketone: 1.99 g

TABLE 4

|  | Compound No. 49 (($CF_3SO_2$)$_2$N$^-$ salt) (mg) | Smectite (mg) | Light resistance (%) | Moist heat resistance (%) |
|---|---|---|---|---|
| Evaluation example 4-1 | 25 | 75 | 99.8 | 99.5 |
| Comparative evaluation example 4-1 | 25 | 0 | 99.2 | 60.7 |

Composition of Evaluation Example 5

Cyanine compound (described in Table 5): 2.00 mg
Diimmonium compound (described in Table 5):25.0 mg
Smectite(**) (Lipophilic smectite: Lucentite SSN-A; manufactured by CO-OP Chemical Co., Ltd.): 75.0 mg
Acrylic adhesive (DB Bond 5541; manufactured by Diabond Industry Co., Ltd.): 4.68 g
Methyl ethyl ketone: 1.99 g

TABLE 5

|  | Cyanine compound | Diimmonium compound | Smectite | Light resistance (%) | Moist heat resistance (%) |
|---|---|---|---|---|---|
| Evaluation example 5-1 (Visible light region) | Compound No. 1 ($ClO_4^-$ salt) | Compound No. 49 (($CF_3SO_2)_2)N^-$salt) | Present | 99.9 | 100 |
| Evaluation example 5-2 (Near Infrared region) | Compound No. 1 ($ClO_4^-$ salt) | Compound No. 49 (($CF_3SO_2)_2)N^-$salt) | Present | 98.8 | 99.5 |
| Comparative evaluation example 5-1 (Visible light region) | Compound No. 1 ($ClO_4^-$ salt) | — | Absent | 79.0 | 67.4 |
| Comparative evaluation example 5-2 (Near Infrared region) | — | Compound No. 49 (($CF_3SO_2)_2)N^-$salt) | Absent | 99.2 | 60.7 |
| Comparative evaluation example 5-3 (Near Infraredregion) | Compound No. 1 ($ClO_4^-$ salt) | Compound No. 49 (($CF_3SO_2)_2)N^-$salt) | Absent | 97.1 | 63.6 |

** No smectite was added in Comparative evaluation examples 5-1 to 5-3.

Example 1

Manufacture of Optical Filter 1

An adhesive solution prepared with the following composition was applied to a 188-μm thick PET film pretreated for facilitating adhesion using a bar coater No. 30 and then dried at 100° C. for 10 minutes to prepare an optical filter having an about 10-μm thick adhesive layer formed on the PET film. The absorption spectrum of this optical filter measured with a UV/Vis/NIR spectrophotometer, V-570 manufactured by JASCO Corporation, exhibited $\lambda_{max}$ at 588 nm and a bandwidth at half-maximum of 38 nm.
(Composition)
Perchlorate of Compound No. 1: 2.0 mg
Smectite (Lipophilic smectite: Lucentite STN; CO-OP Chemical Co., Ltd.): 10 mg
Acrylic adhesive (DB Bond 5541; manufactured by Diabond Industry Co., Ltd.): 20 g
Methyl ethyl ketone: 80 g Example 2

Manufacture of Optical Filter 2

An optical filter was prepared similarly to Example 1 except that perchlorate of Compound No. 41 was used instead of perchlorate of Compound No. 1. The absorption spectrum measured with a UV/Vis/NIR spectrophotometer, V-570 manufactured by JASCO Corporation, exhibited $\lambda_{max}$ at 551 nm and a bandwidth at half-maximum of 36 nm.

Example 3

Manufacture of Optical Filter 3

An optical filter was prepared similarly to Example 1 except that perchlorate of Compound No. 49 was used instead of perchlorate of Compound No. 1. The absorption spectrum measured with a UV/Vis/NIR spectrophotometer, V-570 manufactured by JASCO Corporation, exhibited $\lambda_{max}$ at 1151 nm and a bandwidth at half-maximum of 34 nm.

Example 4

Manufacture of Optical Filter 4

An optical filter was prepared similarly to Example 1 except that DX2-PDP-19 (manufactured by Nippon Shokubai Co., Ltd.) was used as the acrylic adhesive instead of DB Bond 5541 and that CORONATE-55E (manufactured by Nippon Polyurethane Industry Co., Ltd.) was used as a curing agent. The absorption spectrum measured with a UV/Vis/NIR spectrophotometer, V-570 manufactured by JASCO Corporation, exhibited $\lambda_{max}$ at 589 nm and a bandwidth at half-maximum of 38 nm.

Evaluation examples, Comparative evaluation examples and Examples described above indicate the followings.

In the systems containing the adhesive related to the present invention, for Evaluation examples 1-1 to 1-8 and Evaluation examples 2-1 to 2-3 containing perchlorate of Compound No. 1 or hexafluorophosphate of Compound No. 4, which are the dye compounds related to the present invention, and Lucentite STN or SPN (lipophilic smectite; manufactured by CO-OP Chemical Co., Ltd.) or Somacif, which are the layered clay minerals related to the present invention, the light resistance and moist heat resistance are roughly 1.1 to 1.3 times and 2.2 to 11 times, respectively, as high as those for Comparative evaluation examples 1-1 and 2-1 containing no layered clay mineral and those for Comparative evaluation examples 1-2 to 1-4 and 2-2 containing silver halides instead of the layered clay mineral.

In the systems containing the adhesive related to the present invention, for Evaluation examples 3-1 to 3-4 and 4-1 to 4-4 containing perchlorate of Compound No. 1, perchlorate of Compound No. 41, perchlorate of Compound No. 42, perchlorate of Compound No. 43, or bistrifluoromethylsulfonylimide salt of Compound No. 49, which are the dye compounds related to the present invention, and Lucentite SSN or SSN-A (lipophilic smectite; manufactured by CO-OP Chemical Co., Ltd.), which are the layered clay minerals related to the present invention, the light resistance and moist heat resistance are higher than those for Comparative evaluation examples 3-1 to 3-4 and 4-1 to 4-2 containing no layered clay mineral.

Furthermore, in the systems containing the adhesive related to the present invention, for Evaluation examples 5-1 and 5-2 containing perchlorate of Compound No. 1 and bis-trifluoromethylsulfonylimide salt of Compound No. 49, which are the dye compounds related to the present invention, and Lucentite SSN-A (lipophilic smectite; manufactured by CO-OP Chemical Co., Ltd.), which is the layered clay mineral related to the present invention, in the same layer, the light resistance and moist heat resistance are higher than those for Comparative evaluation examples 5-1 to 5-3 that do not contain the layered clay mineral, and contain singly perchlorate of Compound No. 1, which is the dye compound related to the present invention, singly bistrifluoromethylsulfonylimide salt of Compound No. 49, which is the dye compounds related to the present invention, or both perchlorate of Compound No. 1 and bistrifluoromethylsulfonylimide salt of Compound No. 49, which are the dye compounds related to the present invention in the same layer.

Accordingly, the optical filter of the present invention, which contains the dye compound related to the present invention, the layered clay mineral related to the present invention, and the adhesive related to the present invention, has light resistance high enough for practical use, and this filter is particularly suitable as an optical filter with excellent moist heat resistance.

INDUSTRIAL APPLICABILITY

The present invention provides an optical filter excellent in light resistance and moist heat resistance. Said optical filter is suitable for improving the display quality of image display devices and preventing glare due to external light.

What is claimed is:
1. An optical filter comprising:
   an adhesive layer formed from:
      0.00001 to 1.0 part by mass of at least one dye compound (i); and
      0.0001 to 50 parts by mass of at least one layered clay mineral (ii) that is smectite or mica;
      relative to 100 parts by mass of solid components in a thermoplastic substance (iii) that is an acrylic adhesive,
   wherein the at least one dye compound (i) is a cyanine dye compound represented by general formula (I) below:

[Formula I]

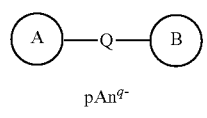

in the Formula I, ring A is a group represented by (a) or (b) below, ring B is a group represented by (a) or (c) below, Q represents a linkage constituting a polymethine chain in which a cyclic structure may be contained, hydrogen atom(s) in said polymethine chain may be replaced by a halogen atom, cyano group, hydroxyl group, alkyl group, alkoxy group, aryl group, or substituted aryl group, $An^{q-}$ represents a q-valent anion, q represents 1 or 2, and p represents a coefficient keeping an electric charge neutral;

[Formula II]

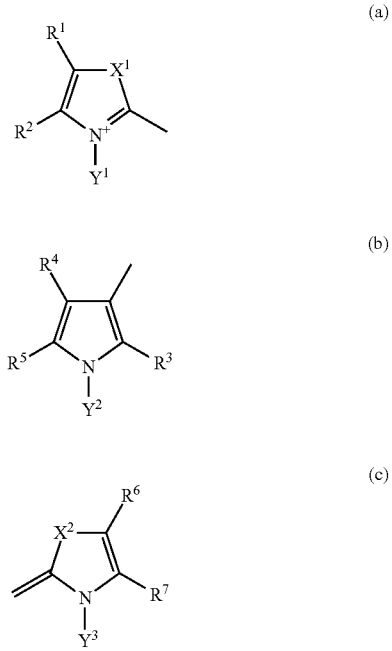

in the Formula II, each of $R^1$, $R^2$, $R^3$, $R^4$, $R^5$, $R^6$, and $R^7$ independently represents a hydrogen atom, hydroxyl group, alkyl group having 1 to 8 carbon atoms and optionally having substituent(s), alkoxy group having 1 to 8 carbon atoms and optionally having substituent(s), aryl group having 6 to 30 carbon atoms and optionally having substituent(s), halogen atom, nitro group, cyano group, or substituent represented by general formula (III) below, in combinations of $R^1$ and $R^2$, $R^4$ and $R^5$, and $R^6$ and $R^7$, the two groups in each combination may be linked to form a carbocyclic or heterocyclic ring system having 3 to 12 carbon atoms, each of $X^1$ and $X^2$ independently represents an oxygen atom, sulfur atom, selenium atom, $^-CR^8R^{9\sim}$, $^-NH^-$, or $^-NY^{a\sim}$ each of $R^8$ and $R^9$ independently represents an alkyl group having 1 to 8 carbon atoms and optionally having substituent, aryl group having 6 to 30 carbon atoms and optionally having substituent(s), substituent represented by general formula (III) below, or substituent represented by general formula IV below, and each of $Y^a$, $Y^1$, and $Y^2$ independently represents a hydrogen atom, alkyl group having 1 to 8 carbon atoms and optionally having substituent(s), alkoxy group having 1 to 8 carbon atoms and optionally having substituent(s), aryl group having 6 to 30 carbon atoms and optionally having substituent(s), or substituent represented by general formula (III) below;

[Formula III]

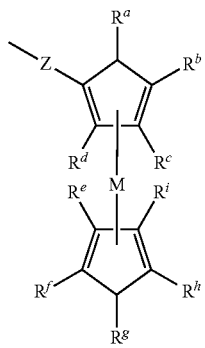

in the Formula III, each of $R^a$ to $R^i$ independently represents a hydrogen atom, hydroxyl group, or alkyl group having 1 to 4 carbon atoms, in which methylene group(s) in said alkyl group may be replaced by —O— or —CO—, Z represents a direct bond or alkylene group having 1 to 8 carbon atoms and optionally having substituent(s), methylene group(s) in said alkylene group may be replaced by —O—, —S—, —CO—, —COO—, —OCO—, —SO$_2$—, —NH—, —CONH—, —NHCO—, —N=CH—, or —CH=CH—, and M represents a metal atoms; and

[Formula IV]

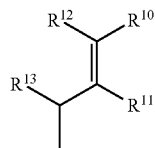

in the formula IV, each of $R^{10}$ to $R^{13}$ independently represents a hydrogen atom, halogen atom, alkyl group having 1 to 4 carbon atoms and optionally having substituent(s), or alkoxy group having 1 to 4 carbon atoms and optionally having substituent(s), and $R^{10}$ and $R^{11}$ may be linked to form a carbocyclic or heterocyclic ring system having 3 to 12 carbon atoms, or the dye compound (i) is a diimmonium compound represented by general formula (V) below:

[Formula V]

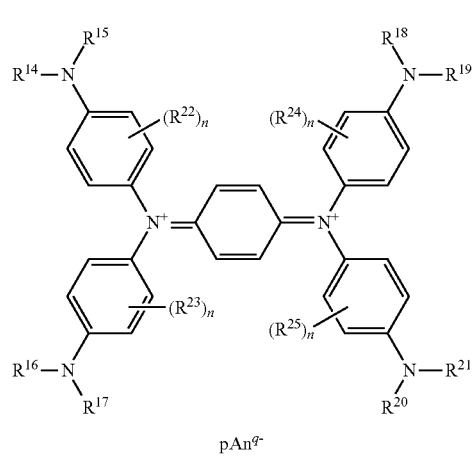

(V)

where each of $R^{14}$, $R^{15}$, $R^{16}$, $R^{17}$, $R^{18}$, $R^{19}$, $R^{20}$, and $R^{21}$ independently represents a hydrogen atom or alkyl group having 1 to 8 carbon atoms and optionally having substituent(s), each of $R^{22}$, $R^{23}$, $R^{24}$, and $R^{25}$ independently represents a hydrogen atom, halogen atom, alkyl group having 1 to 8 carbon atoms and optionally having substituent(s), or an optionally substituted amino group, methylene group(s) in said alkyl group may be replaced by —O— or —CH=CH—, n represents a number of 1 to 4, and $An^{q-}$, p, q, and Q are identical with those in general formula (I).

2. The optical filter according to claim 1, wherein said cyanine compound is represented by general formula (VI) below:

[Formula VI]

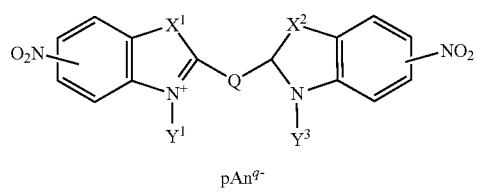

wherein $Y^1$, $Y^3$, $X^1$, and $X^2$ are identical with those in groups (a) and (c) represented by ring A in general formula (I), and $An^{q-}$, p, q and Q are identical with those in general formula (I).

3. The optical filter according to claim 1, wherein the q-valent anion represented by $An^{q-}$ in general formula (V) is a monovalent anion represented by general formula (VII) below:

[Formula VII]

wherein each of $R^{26}$ and $R^{27}$ independently represents an optionally halogenated alkyl group having 1 to 8 carbon atoms.

4. The optical filter according to claim 1, wherein said smectite is lipophilic smectite.

5. The optical filter according to claim 1 used for an image display device.

6. The optical filter according to claim 5, wherein said image display device is a plasma display.

7. The optical filter according to claim 1, wherein an amount of the dye compound (i) per unit area of said optical filter is 1 to 1000 mg/m$^2$.

8. The optical filter according to claim 1, wherein said smectite is selected from hectorite, saponite, stevensite, beidellite, montmorillonite, bentonite or nontronite.

9. The optical filter according to claim 1, wherein when said optical filter is used for an image display, said optical filter contains a light absorber for light at wavelengths including 550 to 600 nm and except 480 to 500 nm for adjusting color hue, or contains a light absorber for 480 to 500 nm light other than the at least one dye compound (i) for preventing reflection or glare of external light.

10. The optical filter according to claim 9, wherein when said image display is a plasma display, a near-infrared absorber for 750 to 1100 nm light other than the at least one dye compound (i) is present.

11. The optical filter according to claim 9, wherein to adjust color hue for eliminating orange light at 550 to 600 nm, said light absorber is selected from trimethinecyanine derivatives, trimethine indolium compounds, trimethine benzoxazolium compounds, trimethine benzothiazolium compounds, pentamethinecyanine derivatives, pentamethine oxazolium compounds, pentamethine thiazolium compounds, squarilium dyes, azomethine dyes, xanthene dyes, azo dyes, pyromethene dyes, azo metal complexes, rhodamine dyes, phthalocyanines, porphyrins, or dipyromethene metal chelates.

12. The optical filter according to claim 9, wherein said light absorber for 480 to 500 nm light for preventing glare due to external light is selected from trimethinecyanine derivatives, trimethine indolium compounds, trimethine oxazolium compounds, trimethine thiazolium compounds, indolidene trimethine thiazonium compounds, phthalocyanines, naphthalocyanines, porphyrins or dipyromethene metal chelates.

* * * * *

UNITED STATES PATENT AND TRADEMARK OFFICE
CERTIFICATE OF CORRECTION

PATENT NO. : 8,501,843 B2
APPLICATION NO. : 11/794260
DATED : August 6, 2013
INVENTOR(S) : Ishida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 526 days.

Signed and Sealed this
Fifteenth Day of September, 2015

Michelle K. Lee
*Director of the United States Patent and Trademark Office*